United States Patent
Suzuki et al.

(10) Patent No.: US 10,618,257 B2
(45) Date of Patent: Apr. 14, 2020

(54) LIGHT-SHIELDING SHEET AND CONTAINER

(71) Applicant: Fujimori Kogyo Co., Ltd., Tokyo (JP)

(72) Inventors: Toyoaki Suzuki, Tokyo (JP); Koichi Miura, Tokyo (JP); Junpei Nomura, Tokyo (JP)

(73) Assignee: Fujimori Kogyo Co., Ltd. (JP)

( * ) Notice: Subject to any disclaimer, the term of this patent is extended or adjusted under 35 U.S.C. 154(b) by 469 days.

(21) Appl. No.: 14/891,940

(22) PCT Filed: May 20, 2014

(86) PCT No.: PCT/JP2014/063297
§ 371 (c)(1),
(2) Date: Nov. 17, 2015

(87) PCT Pub. No.: WO2014/189030
PCT Pub. Date: Nov. 27, 2014

(65) Prior Publication Data
US 2016/0089864 A1    Mar. 31, 2016

(30) Foreign Application Priority Data
May 20, 2013  (JP) .................................. 2013-106307

(51) Int. Cl.
*B32B 27/08* (2006.01)
*B32B 27/20* (2006.01)
(Continued)

(52) U.S. Cl.
CPC .............. *B32B 27/08* (2013.01); *B32B 27/18* (2013.01); *B32B 27/20* (2013.01); *B32B 27/28* (2013.01);
(Continued)

(58) Field of Classification Search
CPC .......... B32B 2307/71; B32B 2323/043; B32B 2323/046; B32B 2323/10; B32B 2439/70;
(Continued)

(56) References Cited

U.S. PATENT DOCUMENTS

| | | | | |
|---|---|---|---|---|
| 2006/0229583 | A1* | 10/2006 | Nagao ..................... | A61J 1/067 604/403 |
| 2007/0166562 | A1* | 7/2007 | Swei ....................... | B32B 27/08 428/500 |
| 2011/0100861 | A1* | 5/2011 | Manabe .................. | A61J 1/067 206/524.6 |

FOREIGN PATENT DOCUMENTS

| CN | 101981153 A | 2/2011 |
|---|---|---|
| JP | 08193149 A | 7/1996 |

(Continued)

OTHER PUBLICATIONS

Solvay Specialty Polymers Solef 21510 Polyvinylidene Fluoride (PVDF), accessed online Nov. 17, 2017.*

(Continued)

*Primary Examiner* — Camie S Thompson
(74) *Attorney, Agent, or Firm* — St. Onge Steward Johnston & Reens, LLC (57) ABSTRACT

Provided are a light-shielding sheet that has a function of shielding light of a specific wavelength and that is capable of preventing a light-shielding substance from being transferred into the contents and seeping out of a container and a container produced using the light-shielding sheet. This light-shielding sheet of the present invention has a multilayer structure of three or more layers including at least one light-shielding layer that shields a specific wavelength and/or eluate-blocking layer that blocks substances eluted from the light-shielding layer. When producing a container from the light-shielding sheet, an eluate-blocking layer A is provided at least between the light-shielding layer and an innermost layer or on the innermost layer, and an eluate-blocking layer B is provided between the light-shielding layer and an outermost layer or on the outermost layer. The light-shielding layer may further double as an eluate-blocking layer.

27 Claims, 2 Drawing Sheets

(51) Int. Cl.
    *B32B 27/32* (2006.01)
    *B32B 27/34* (2006.01)
    *B32B 27/36* (2006.01)
    *B32B 27/18* (2006.01)
    *B32B 27/28* (2006.01)

(52) U.S. Cl.
    CPC ............ *B32B 27/32* (2013.01); *B32B 27/322* (2013.01); *B32B 27/325* (2013.01); *B32B 27/34* (2013.01); *B32B 27/36* (2013.01); *B32B 2307/71* (2013.01); *B32B 2323/043* (2013.01); *B32B 2323/046* (2013.01); *B32B 2323/10* (2013.01); *B32B 2439/70* (2013.01); *B32B 2439/80* (2013.01)

(58) Field of Classification Search
    CPC ..... B32B 2439/80; B32B 27/20; B32B 27/32; B32B 27/325; B32B 27/34; B32B 27/322; B32B 27/08; B32B 27/18; B32B 27/28; B32B 27/3426; B32B 1/71; B32B 439/70; B32B 439/80; B32B 27/03; B32B 27/3436; B32B 27/36; A61J 1/00; B65D 65/40
    USPC ......... 428/35.7, 421, 516, 476.9, 34.6, 35.9; 206/524.6
    See application file for complete search history.

(56) References Cited

FOREIGN PATENT DOCUMENTS

| | | | |
|---|---|---|---|
| JP | 2003275280 A | | 9/2003 |
| JP | 2004202899 A | | 7/2004 |
| JP | 2005305745 A | | 11/2005 |
| JP | 2006289070 A | | 10/2006 |
| JP | 2006326956 A | | 12/2006 |
| JP | 2007302328 A | | 11/2007 |
| JP | 2008104868 A | | 5/2008 |
| JP | 2008174304 A | | 7/2008 |
| JP | 2008230112 A | | 10/2008 |
| JP | 2010-042824 | * | 2/2010 |
| JP | 2011203400 A | | 10/2011 |
| JP | 2012135621 A | | 7/2012 |
| JP | 2012206514 A | | 10/2012 |

OTHER PUBLICATIONS

International Search Report Application No. PCT/JP2014/063297 Completed: Aug. 19, 2014; dated Sep. 9, 2014 7 pages.

Office Action Country: China Application No. 201480029023.3 dated Sep. 1, 2016 11 pages, Partial Translation.

Office Action from Japan Application No. 2015-518250 dated Nov. 13, 2018 10 pages including English Translation.

* cited by examiner

LIGHT-SHIELDING SHEET AND CONTAINER

FIELD OF THE INVENTION

The present invention relates to a sheet, a package, and a container for storing pharmaceutical products and medical supplies, such as a blister sheet, an infusion solution and liquid medicine bag, a plastic ampoule and vial, a plastic syringe, and medicines, various cosmetics, foods, and the like as contents. Specifically, the present invention relates to a sheet and a container which make a visual check of contents to be stored possible, have a function of shielding light of a specific wavelength, and are capable of preventing contamination resulting from elution of substances from the sheet or the container into contents or bleeding out of the substances to the outside.

BACKGROUND OF THE INVENTION

Conventionally, shielding light of a specific wavelength has often been suggested as a function of enhancing storage stability of contents in sheets, packages, and containers for storing pharmaceutical products, medical supplies, various cosmetics, foods and the like as contents.

Sheets and containers that prevent deterioration in quality of contents by the influence of deterioration due to ultraviolet rays and the like are demanded for some of pharmaceutical products and medical supplies such as medicines, various cosmetics, foods, and the like, which are stored in PTP packaging and blister packaging, obtained by thermoforming a blister sheet, a soft bag such as an infusion solution and liquid medicine bag, a plastic ampoule and vial, and a syringe.

Containers for infusion solutions and liquid medicines are used for various infusion solutions and pharmaceutical products. However, when drugs which are easily deteriorated by light, particularly, vitamins and amines are contained in various infusion solutions and pharmaceutical products, it is necessary to protect the contents from light and to shield light not only in an ultraviolet range but also in a visible range from these drugs.

These infusion solutions and liquid medicines are prepared in advance or prepared when being used (dripped). Since these infusion solutions and liquid medicines are generally stored in a packing material having light-shielding properties such as cardboard until being used, there is substantially no possibility that these solutions and liquid medicines are exposed to light and a main problem is deterioration due to light while being used. Therefore, when these solutions and medicines are used, a container such as an infusion solution bag is covered with a cover made of a light-shielding film in many cases. However, since the light-shielding film is colored, it is difficult to visually check the state of the infusion solution in the infusion solution container and changes in the liquid level and the dripping progress state cannot be grasped. Thus, there is a possibility that appropriate dripping cannot be achieved.

In order to solve such a problem, Japanese Publication No. 2003-275280 discloses a light-shielding cover for an infusion solution container that is covered an infusion solution bag with a colored film later for realizing light-shielding and provided with a window for checking the amount of contents remaining. However, with this configuration, an infusion solution bag which is an immediate container does not have any light-shielding function and there is a concern of deterioration in quality of contents such as drugs which are sensitive to light due to light such as ultraviolet rays in a step of drug filling or in a step of inspection.

Japanese Publication No. 2008-230112 discloses a laminated body that is used for PTP packaging or blister packing. A laminating material for pharmaceutical products and medical supplies is a laminating material which has a function of shielding light of a specific wavelength (light shielding properties) and oxygen barrier properties and an ultraviolet absorber and a yellow pigment are kneaded in the laminating material. Application of ink imparts a function of shielding light of a specific wavelength and an oxygen barrier function. However, countermeasures for inhibiting substances from being eluted from the ultraviolet absorber, yellow pigment and ink, which are used for imparting a light-shielding function, into the contents are not taken.

In addition, the total light transmittance at a wavelength of 500 nm is 5% or lower, and the visibility of the contents is not good. For example, in the testing method for pharmaceutical containers described in the Japanese Pharmacopoeia, regarding the transparency of containers, the total light transmittance at a wavelength of 450 nm is 55% or more. It is relatively easy to shield light with a wavelength of 500 nm or less. However, it is not easy to achieve a total light transmittance at a wavelength of 450 nm of 55% or more while shielding light in an ultraviolet range with a wavelength of 400 nm or less.

Japanese Publication No. 2007-302328 discloses a light-shielding laminated sheet as an outer packaging bag for a prefilled syringe. As described above, there are many examples of outer packaging bags in which a light-shielding function is not imparted to an immediate container that comes into contact with a pharmaceutical product and these outer packaging bags are preferable from the viewpoint of safety of contents. However, with the same configuration as in the Japanese Publication No. 2003-275280, a prefilled syringe which is an immediate container does not have any light-shielding function and there is a concern of deterioration in quality of contents such as drugs, which are sensitive to light, due to light such as ultraviolet rays in a step of drug filling or in a step of inspection.

On the other hand, Japanese Publication No. H8-193149 discloses a container obtained using a coloring pigment in an infusion solution bag itself as a container in which a light-shielding function is provided to an immediate container that comes into contact with the contents. Among these, an infusion solution bag is strictly restricted by the testing method for plastic containers for infusion solutions described in the Japanese Pharmacopoeia of Pharmaceutical Affairs Law. For example, a general organic absorbent cannot be used in an eluate test. Further, there are difficulties that the ignition residue is limited to 0.10% or less and an inorganic ultraviolet absorber such as titanium dioxide particulates cannot be used. Therefore, there is disclosed a colored resin composition for an infusion solution bag which did not exist in the past and has excellent physiological safety, a high degree of transparency, heat resistance, and an ultraviolet absorbing effect over almost the entire ultraviolet range in a pigment composition investigation without causing elution. This resin composition can be suitably used for an infusion solution bag and a packaging material thereof.

However, the composition almost completely shields the light of a wavelength of 450 nm and the content visibility is not good. As described above, in the testing method for pharmaceutical containers described in the Japanese Pharmacopoeia, regarding the transparency of containers, the total light transmittance at a wavelength of 450 nm is 55% or more. It is relatively easy to shield light of 500 nm or less as in Japanese Publication No. H8-193149. However, it is not easy to achieve a total light transmittance at a wavelength of 450 nm of 55% or more while shielding light in an ultraviolet range of 400 nm or less.

As a container in which a light-shielding function is provided to an immediate container for storing a pharmaceutical product, Japanese Publication No. 2008-104868 discloses a plastic ampoule. From the viewpoint of preventing elution of a pigment and an ultraviolet absorber into a drug, cyclic olefin having a glass transition temperature of 60° C. to 80° C. is used for an intermediate layer of the container. However, since the pigment and the ultraviolet absorber are added to the outer layer of the cyclic olefin layer and in such a container, the pigment and the ultraviolet absorber are bled out of the container. Thus, there is a possibility of causing contamination of the container or other products. In addition, at a glass transition temperature of 60° C. to 80° C., for use in a high temperature region, intermolecular motion is promoted and elution of the components into the liquid contents cannot be inhibited. Therefore, these problems are not completely solved.

SUMMARY OF THE INVENTION

Technical Problem

The present invention is made in consideration of the disadvantages of the related art and an object thereof is to provide a light-shielding sheet and a light-shielding container for storing pharmaceutical products, medical supplies, various cosmetics, foods, and the like while coming into direct contact with the contents, which makes visual inspection of contents to be stored possible, has a function of shielding light of a specific wavelength for enhancing the storage stability of the contents without contamination resulting from elution of light-shielding substances such as an ultraviolet absorber, an organic or inorganic pigment, an inorganic substance, a colored pigment, a fluorescent brightening agent, and a dye into the contents or bleeding out of the substances to the outside.

Solution to Problem

As a result of intensive investigation conducted by the present inventors to achieve the object, it has been found that the above problems can be solved by forming a multilayer sheet having a total of three or more layers including at least one light-shielding layer that contains at least one component of an ultraviolet absorber, an organic or inorganic pigment, an inorganic substance, a colored pigment, a fluorescent brightening agent, and a dye, and at least one eluate-blocking layer that blocks substances eluted from the light-shielding layer, or a container produced using the sheet, using a cyclic polyolefin-based resin, a fluorine-based resin, a polyester-based resin, or a polyamide-based resin in the eluate-blocking layer and/or the light-shielding layer as a main component, and the present invention has been accomplished.

That is, the present invention provides a light-shielding sheet that have a function of shielding light of a specific wavelength without contamination resulting from elution of light-shielding substances such as an ultraviolet absorber, an organic or inorganic pigment, an inorganic substance, a colored pigment, a fluorescent brightening agent, and a dye, into contents or bleeding out of the substances to the outside, and a container. The present invention is configured as follows.

(1) A light-shielding sheet that has a multilayer structure of three or more layers including one or more of the group consisting of one or more light-shielding layers and one or more eluate-blocking layers, in which the light-shielding layer is made of a resin containing at least one of an ultraviolet absorber, an organic pigment, an inorganic pigment, an inorganic substance, a colored pigment, a fluorescent brightening agent, and a dye, and is provided in an intermediate layer of the sheet, and the eluate-blocking layer is provided on at least one surface of the sheet or between at least one surface of the sheet and the light-shielding layer.

(2) The light-shielding sheet according to (1), in which a total light transmittance of the sheet having the multilayer structure at a wavelength of 380 nm or less is 1% or less and a total light transmittance at a wavelength of 380 nm or more and 400 nm or less is 30% or lower.

(3) The light-shielding sheet according to (1) or (2), in which the eluate-blocking layer has any one of a cyclic polyolefin-based resin or a fluorine-based resin, a polyester-based resin, and a polyamide-based resin as a main component.

(4) The light-shielding sheet according to any one of (1) to (3), in which the light-shielding layer has at least any one of a cyclic polyolefin-based resin, a fluorine-based resin, and a polyester-based resin as a main component.

(5) The light-shielding sheet according to (1), in which the light-shielding layer has at least any one of a linear low-density polyethylene-based resin having a density of 0.905 or higher, a high-density polyethylene-based resin having a density of 0.94 or higher, and a polypropylene-based resin having a density of 0.88 or higher as a main component.

(6) The light-shielding sheet according to any one of (1) to (4), in which a cyclic polyolefin-based resin is used for the eluate-blocking layer and the light-shielding layer and a glass transition temperature thereof is 60° C. or higher.

(7) The light-shielding sheet according to (6), in which the glass transition temperature of the cyclic polyolefin-based resin is 110° C. or higher.

(8) The light-shielding sheet according to any one of (1) to (4), in which the eluate-blocking layer and the light-shielding layer have a fluorine-based resin as a main component, and a density of the fluorine-based resin is 1.3 g/cm$^3$ or higher.

(9) The light-shielding sheet according to any one of (1) to (8), in which a total light transmittance at a wavelength of 450 nm or longer is 15% or higher.

(10) The light-shielding sheet according to (9), in which the total light transmittance at a wavelength of 450 nm or longer is 55% or higher.

(11) A light-shielding container that is produced using the light-shielding sheet according to any one of (1) to (10).

(12) A container in which a solution for pharmaceutical and medical use is stored in the light-shielding container according to (11) as contents and the container is sterilized with high pressure steam at a temperature of 101° C. or higher.

(13) The container according to (11), in which the solution for pharmaceutical and medical use is a liquid drug in which at least one of deterioration, lowering of titer, and impurity formation is caused by one or more of the group consisting of ultraviolet rays and visible light at a wavelength range of 220 nm to 450 nm.

(14) The container according to (13), in which the drug includes one or more of levofloxacin, a derivative thereof, and a modification thereof.

(15) The container according to (13), in which the drug includes one or more of the group consisting of palonosetron hydrochloride, a derivative thereof, and a modification thereof.

(16) A method of producing a light-shielding container including producing a container using the light-shielding sheet according to (1) by one or more methods selected from the group consisting of extrusion direct blow molding, extrusion drawing blow molding, multidimensional blow molding, exchange blow molding, injection blow molding, and injection drawing blow molding, multilayer blow molding, and multilayer injection blow molding.

Effects of Invention

When the light-shielding sheet of the present invention is formed into a container, visual inspection of contents to be stored is possible and the container has a function of shielding light of a specific wavelength for enhancing the storage stability of contents. Even when the container is stored at a high temperature of 50° C. or higher or subjected to a heat treatment represented as hot filling at 70° C. to 95° C., an inactivation treatment of viruses or the like by heat of 60° C. to 70° C., a sterilization treatment with high pressure steam at a temperature of 101° C. or higher, and the like, the container has very high safety and excellent practicality as a container which contains pharmaceutical products, medical supplies, various cosmetics, foods, and the like while coming into direct contact with the pharmaceutical products, medical supplies, various cosmetics, foods, and the like without contamination resulting from elution of light-shielding substances (an ultraviolet absorber, an organic or inorganic pigment, an inorganic substance, a colored pigment, a fluorescent brightening agent, a dye and the like) into the contents or bleeding out of the substances to the outside.

The details are as follows.

In the container of the present invention, since the sheet of the present invention has a multilayer structure of three or more layers including a light-shielding layer and/or an eluate-blocking layer, transmission of a specific wavelength can be inhibited, visibility that makes visual inspection possible can be ensured, and eluates of light-shielding substances (an ultraviolet absorber, an organic or inorganic pigment, an inorganic substance, a colored pigment, a fluorescent brightening agent, a dye and the like) into the container can be inhibited.

In the container of the present invention, since most of light in a harmful ultraviolet range having a wavelength of 380 nm or shorter can be shielded and light in a high wavelength band of 380 nm to 400 nm also can be shielded, the stability of contents can be enhanced.

In the container of the present invention, light-shielding substances such as an ultraviolet absorber, an organic or inorganic pigment, an inorganic substance, a colored pigment, a fluorescent brightening agent, a dye and the like can be inhibited from being eluted to the outside of the container.

In the container of the present invention, an eluate blocking effect can be enhanced by adjusting the component of the eluate-blocking layer in the sheet of the present invention.

In the container of the present invention, similarly, light-shielding substances such as an ultraviolet absorber, an organic or inorganic pigment, an inorganic substance, a colored pigment, a fluorescent brightening agent, a dye and the like can be inhibited from being eluted into the container or bleeding out of the container.

In the sheet of the present invention, the light-shielding layer can double as an eluate-blocking layer by selecting the resin for the light-shielding layer. That is, the present invention provides a light-shielding sheet that has a multilayer structure of three or more layers including at least one light-shielding layer. The light-shielding layer is made of a resin that has at least one of a cyclic polyolefin-based resin, a fluorine-based resin, and a polyester-based resin as a main component and further contains at least one of an ultraviolet absorber, an organic pigment, an inorganic pigment, an inorganic substance, a colored pigment, a fluorescent brightening agent, a dye and the like and is provided in an intermediate layer. In the light-shielding sheet, light-shielding substances can be inhibited from being eluted into the container or bleeding out of the container by only the light-shielding layer.

In the sheet of the present invention, a soft resin can be used as the resin for the light-shielding layer. The flexibility of the sheet and the container produced using the sheet can be enhanced, and the drop impact strength can be enhanced by improving the discharge efficiency of liquid contents.

In the sheet of the present invention, in the case in which the sheet is formed into a container, the molecular motion of the resin of the eluate-blocking layer and the light-shielding layer can be inhibited by increasing the glass transition temperature of the resin used for the eluate-blocking layer and the light-shielding layer even when the container is placed under a high temperature environment during filling of liquid contents or in sterilization after filling of liquid contents, storage, use, and the like at a high temperature. Thus, light-shielding substances such as an ultraviolet absorber, an organic or inorganic pigment, an inorganic substance, a colored pigment, a fluorescent brightening agent, a dye and the like can be highly inhibited from being eluted into the container or bleeding to the outside of the container.

In the sheet of the present invention, since the total light transmittance is adjusted, when the sheet is formed into a container, light of a specific wavelength is shielded to enhance the storage stability of contents and visual inspection in an inspection step after filling of the contents is possible.

The sheet of the present invention can be used for a container for storing a liquid for medical use, which is subjected to high pressure steam sterilization.

In the container of the present invention, a liquid drug in which at least one of deterioration, lowering of titer, and impurity formation is caused by ultraviolet rays and/or visible light can be stably stored.

In the container of the present invention, a liquid drug including levofloxacin, a derivative thereof, or a modification thereof can be stably stored and distributed.

In the container of the present invention, a liquid drug including palonosetron hydrochloride, a derivative thereof, or a modification thereof can be stably stored and distributed.

DETAILED DESCRIPTION OF THE INVENTION

Hereinafter, preferred embodiments of a light-shielding sheet and a light-shielding container according to the present invention will be described.

Figure 1A:
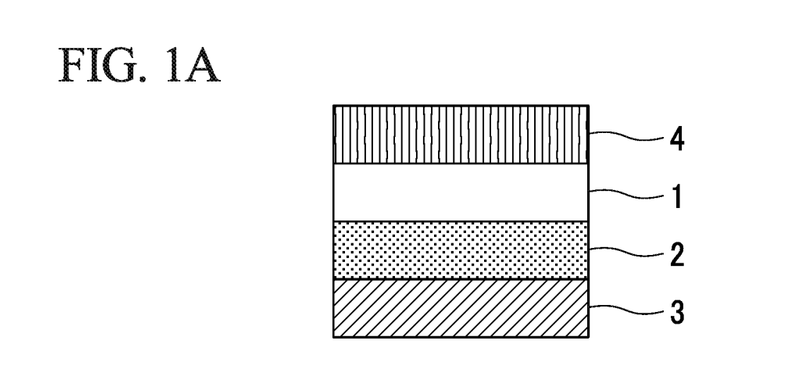
FIG. 1A is a sectional schematic view showing a layer configuration of a light-shielding sheet and a container of the present invention.
Figure 1B:
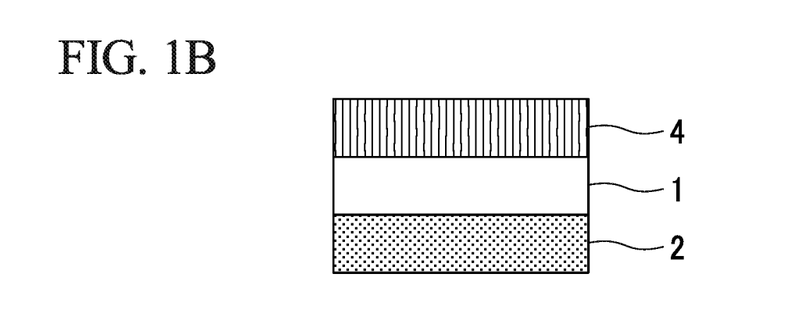
FIG. 1B is a sectional schematic view showing a layer configuration of the light-shielding sheet and the container of the present invention.
Figure 1C:
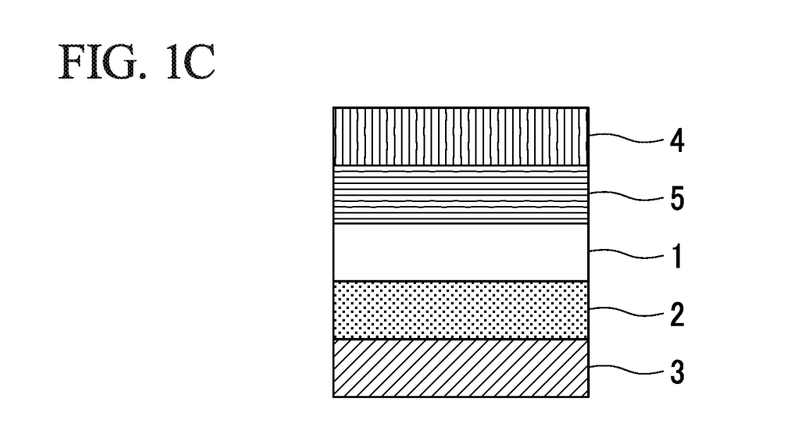
FIG. 1C is a sectional schematic view showing a layer configuration of the light-shielding sheet and the container of the present invention.
Figure 1D:
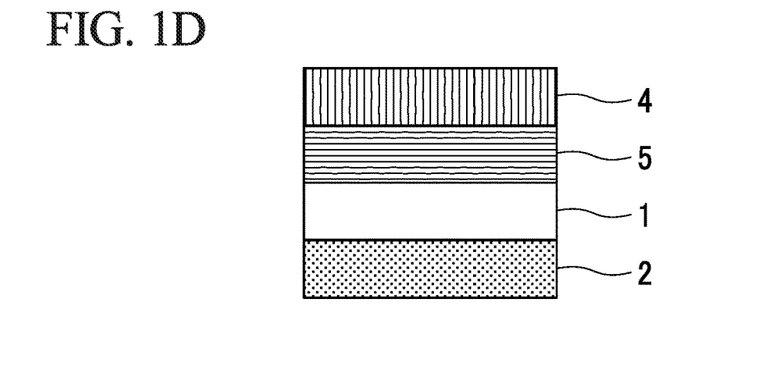
FIG. 1D is a sectional schematic view showing a layer configuration of the light-shielding sheet and the container of the present invention.
Figure 1E:
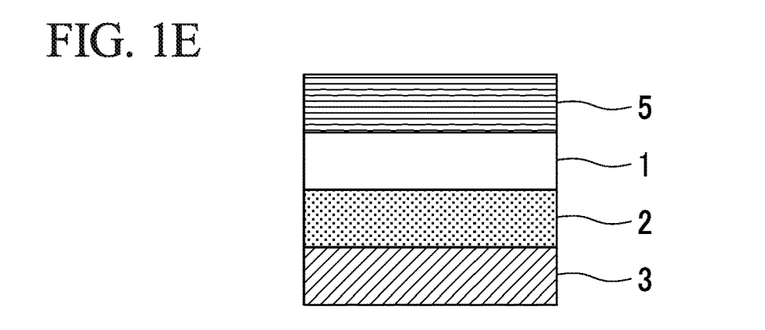
FIG. 1E is a sectional schematic view showing a layer configuration of the light-shielding sheet and the container of the present invention.
Figure 1F:
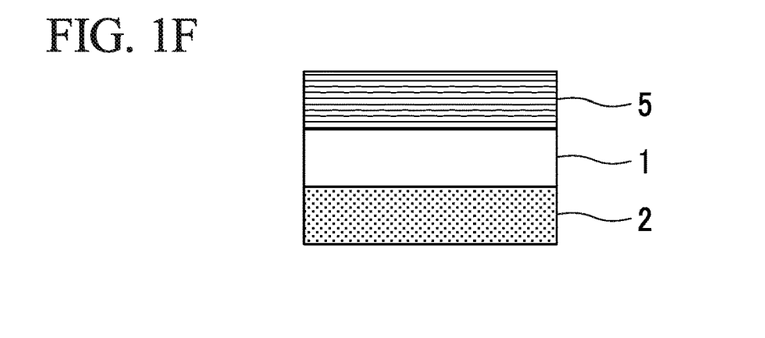
FIG. 1F is a sectional schematic view showing a layer configuration of the light-shielding sheet and the container of the present invention.
Figure 1G:
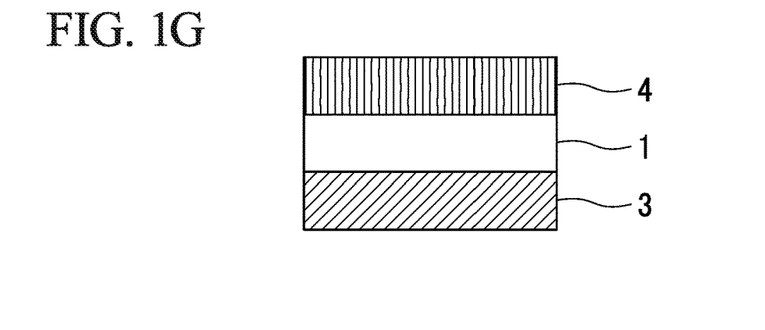
FIG. 1G is a sectional schematic view showing a layer configuration of the light-shielding sheet and the container of the present invention.

FIGS. 1A to 1G are sectional schematic views showing combinations of layer configurations of a light-shielding sheet and a light-shielding container according to embodiments of the present invention.

Although not shown in the drawings, one of or two or more of an adhesive layer, a gas barrier layer, and a water vapor barrier layer can be provided between the layers as required.

In the container of the present invention, an innermost layer refers a layer which is in direct contact with contents to be stored in the container when the sheet of the present invention is formed into a container.

In the container of the present invention, an outermost layer refers to a layer which is the outermost layer of the container and comes into contact with the outside of the container when the sheet of the present invention is formed into a container.

The light-shielding sheet and the container of the present invention are a light-shielding sheet that has a multilayer structure of three or more layers including one or more of the group consisting of one or more light-shielding layers and one or more eluate-blocking layers, and a container produced using the light-shielding sheet. When the total light transmittance of the sheet and the container at a wavelength of 380 nm or shorter is set to 1% or lower, a near ultraviolet ray portion of a wavelength of 380 nm to 200 nm, which is thought to be the most harmful, can be shielded and the effect of enhancing the storage stability of contents is obtained.

In addition, when the total light transmittance at a wavelength of 380 nm to 400 nm is set to 30% or lower and preferably set to 1% or lower, the ultraviolet ray portion near to visible light can be shielded and the storage stability of contents can be further enhanced. Even when the total light transmittance is in a range of higher than 1% and lower than 30%, a certain degree of a light-shielding effect is obtained and thus the sheet and the container can be used for most contents such as pharmaceutical products, cosmetics, foods and the like.

When the total light transmittance at a wavelength of 450 nm is set to 15% or higher and more preferably set to 55% or higher, the contents in the multilayer sheet and the container are visible from the outside and foreign substances and defective products can be eliminated in a step of visual inspection and the effect of enhancing quality can be obtained. The total light transmittance at a wavelength of 450 nm of 15% or higher is a level in which visual inspection is possible and thus it is necessary to set the minimum to 15% or higher, preferably 30% or higher, and more preferably 55% or higher. When the total light transmittance is 55% or higher, the container can satisfy transparency test standards in the testing method for pharmaceutical containers of the Japanese Pharmacopoeia, Sixteenth Edition, described in the Pharmaceutical Affairs Law and can be easily applied to containers for injections, infusion solutions and liquid medicines among containers for liquid pharmaceutical products. In many of the light-shielding containers that have been suggested, the importance of transmission at 450 nm is not mentioned. A total light transmittance of 15% or lower is not preferable because visual inspection of contents is not easy and a risk of omission occurrence in the inspection of defective products is high.

When the sheet is formed into a container, a light-shielding layer is provided as at least one layer of an intermediate layer portion other than the outermost layer and the innermost layer in the light-shielding sheet of the present invention.

The light-shielding layer is a resin layer containing at least one of an ultraviolet absorber, an organic or inorganic pigment, an inorganic substance, a colored pigment, a fluorescent brightening agent, and a dye, and as long as the light-shielding layer is the light-shielding sheet and a layer (intermediate layer) of the container other than the outermost layer and the innermost layer, the layer may be provided at any position in the multilayer structure. The light-shielding layer may be provided as a single layer or multiple layers. The number of layers is not limited as long as a light-shielding effect can be obtained.

In the case of using a transparent thermoplastic resin as the resin for the light-shielding layer, when a linear low-density polyethylene-based resin having a density of 0.905 to 0.95, a high-density polyethylene-based resin having a density of 0.94 to 0.98, or a polypropylene-based resin having a density of 0.88 to 0.91 is used, flexibility can be enhanced and the discharge efficiency of liquid contents is improved to improve drop impact strength. Thus, this case is preferable. Additionally, for example, resins such as an acid-modified polyolefin-based resin obtained by modifying a polyolefin-based resin such as low-density polyethylene, medium-density polyethylene, high-density polyethylene, a random copolymer of ethylene and propylene, a block copolymer, a polyethylene-based elastomer, a polypropylene-based elastomer, a styrene-based elastomer, an ethylene-vinyl acetate copolymer, methyltenpen, polybutene, polyethylene, or polypropylene, with acrylic acid, methacrylic acid, maleic acid, maleic anhydride, fumaric acid, itaconic acid, and other unsaturated carboxylic acids, and a urethane-based resin, can be used. In addition, when an adhesive resin layer for adhesion with other resin layers is used as a multilayer, the resin layer can be used as a light-shielding layer. A known adhesive resin can be used as the adhesive resin and for example, an ADMER resin produced by Mitsui Chemicals, Inc., Modic produced by Mitsubishi Chemical Corporation, DLZ produced by Tosoh Corporation, a metallocene-based linear low-density polyethylene having a density of 0.91 or lower, a polyamide-based resin, copolymers of a polyamide-based resin and other resins, substituents thereof, modifications thereof, and the like can be used. When the light-shielding layer is provided as a single layer or multiple layers, the total thickness thereof is in a range of 10 μm to 200 μm and preferably in a range of 20 μm to 100 μm. When the thickness is 10 μm or less, the light-shielding effect is reduced and an appropriate level of stability of liquid contents cannot be maintained. Further, when the thickness is 200 μm or more, the multilayer sheet and the container have increased thickness and thus are not practical. Thus, this case is not preferable.

The melting point of the linear low-density polyethylene is a value of a melting peak temperature measured according to JIS K 7121 (DSC) and is preferably 105° C. to 130° C. and particularly preferably 110° C. to 130° C. The melting point of the high-density polyethylene is a value of a melting peak temperature measured according to JIS K 7121 (DSC) and is preferably 120° C. to 145° C. and particularly preferably 130° C. to 140° C. The melting point of the polypropylene is a value of a melting peak temperature measured according to JIS K 7121 (DSC) and is preferably 118° C. to 170° C. and particularly preferably 123° C. to 165° C. In addition, a polymer blend containing the aforementioned linear low-density polyethylene, high-density polyethylene, or polypropylene as a main component may also be employed. Further, to the aforementioned polyethylene-based resin and polypropylene-based resin, known additives such as an antioxidant, a photo-stabilizer, a neutralizing agent, an α-nucleating agent, a β-nucleating agent, an anti-blocking agent, and a lubricant may be added in such an amount that the object of the invention is not impaired.

In the present invention, the term "main component" refers to a component having a content of 60% by weight or more.

The resin for the light-shielding layer forms a layer containing any one of a cyclic polyolefin-based resin, a fluorine-based resin and a polyester-based resin as a main component. Thus, a higher effect of preventing light-shielding substances (an ultraviolet absorber, an organic or inorganic pigment, an inorganic substance, a colored pigment, a fluorescent brightening agent, a dye, and the like) used for the light-shielding layer from being eluted into contents or liquid contents or bleeding out of the container through interlayer movement of these substances when the light-shielding sheet and the container are stored at a high temperature of 50° C. or higher or subjected to a heat treatment represented as hot filling at 70° C. to 95° C., an inactivation treatment of viruses or the like by heat of 60° C. to 70° C., a sterilization treatment with high pressure steam at a temperature of 100° C. or higher, or the like can be obtained and this case is preferable. The cyclic polyolefin-based resin, fluorine-based resin and polyester-based resin may form a layer alone or in combination of two or more thereof.

In the sheet of the present invention, an eluate-blocking layer is provided on one surface of the sheet or between one surface and the light-shielding layer. In the case in which a container is produced using the sheet, when the one surface is provided on the content side, substances eluted into liquid contents by interlayer moving substances (an ultraviolet absorber, an organic or inorganic pigment, an inorganic substance, a colored pigment, a fluorescent brightening agent, a dye and the like), which are eluted from the light-shielding layer, can be blocked (hereinafter, the eluate-blocking layer in this embodiment is referred to as an eluate-blocking layer A). On the other hand, in the case in which a container is produced using the sheet, when the one surface is provided on the outer side of the container, other containers or production lines can be prevented from being contaminated due to bleeding out of interlayer moving substances (an ultraviolet absorber, an organic or inorganic pigment, an inorganic substance, a colored pigment, a fluorescent brightening agent, a dye and the like), which are eluted from the light-shielding layer, to the outside of the container (hereinafter, the eluate-blocking layer in this embodiment is referred to as an eluate-blocking layer B).

The eluate-blocking layer A may be provided on the side closer to contents than the light-shielding layer when the sheet is formed into a container, may be directly laminated on the light-shielding layer, or may be laminated though an adhesive layer and other layers.

The eluate-blocking layer B may be provided on the outer side of the light-shielding layer, may be directly laminated on the light-shielding layer, or may be laminated though an adhesive layer and other layers.

When the eluate-blocking layer A and the eluate-blocking layer B are formed to have a layer containing any one of a cyclic polyolefin-based resin, a fluorine-based resin, a polyester-based resin, and a polyamide-based resin as a main component, an ultraviolet absorber, an organic or inorganic pigment, an inorganic substance, a colored pigment, a fluorescent brightening agent, a dye and the like used for the light-shielding layer can be prevented from being eluted into liquid contents or bleeding out of the container through interlayer movement of these light-shielding substances when the light-shielding sheet and the container are stored at a high temperature of 50° C. or higher or subjected to a heat treatment represented as hot filling at 70° C. to 95° C., an inactivation treatment of viruses or the like by heat of 60° C. to 70° C., a sterilization treatment with high pressure steam at a temperature of 100° C. or higher, or the like. In addition, when a resin containing any one of a cyclic polyolefin-based resin, a fluorine-based resin and a polyester-based resin as a main component is used as the resin for the light-shielding layer, a higher interlayer moving substance-blocking effect by the eluate-blocking layers A and B is obtained and thus this case is preferable. The cyclic polyolefin-based resin, the fluorine-based resin, the polyester-based resin and the polyamide-based resin may form a layer alone or in combination of two or more thereof. The eluate-blocking layers A and B may be provided as a single layer respectively or plural layers. The thickness of each single layer is in a range of 5 μm to 300 μm and preferably in a range of 10 μm to 200 μm. When the thickness is 5 μm or less, the eluate-blocking effect is small and an appropriate level of stability of liquid contents cannot be maintained. Further, when the thickness is 300 μm or more, the multilayer sheet and the container have an increased thickness and thus are not practical. Thus, this case is not preferable. When the thickness is in a range of 10 μm to 200 μm, a sufficient eluate-blocking effect can be obtained and sufficient flexibility can be imparted to the sheet and the container. Thus, this case is more preferable.

The cyclic polyolefin-based resin used for the light-shielding layer, the eluate-blocking layer A and the eluate-blocking layer B has a glass transition temperature of 60° C. or higher, preferably 110° C. or higher, and more preferably 126° C. or higher. In the case in which the glass transition temperature is 60° C. or lower, the polymer molecular motion is promoted when the sheet and the container are stored at a high temperature of 50° C. or higher or subjected to a heat treatment represented as hot filling at 70° C. to 95° C., an inactivation treatment of viruses or the like by heat of 60° C. to 70° C., a sterilization treatment with high pressure steam at a temperature of 100° C. or higher, or the like, and interlayer movement of an ultraviolet absorber, a pigment, and an inorganic substance easily occurs. Thus, this case is not preferable. Further, in the case in which the glass transition temperature is 110° C. or higher, even when sterilization is carried out at a high pressure steam sterilization temperature of 105° C., interlayer movement of an ultraviolet absorber, an organic or inorganic pigment, an inorganic substance, a colored pigment, and the like does not occur and the substances can be prevented from being eluted into liquid contents or bleeding out of the container. Thus, this case is preferable. Further, in the case in which the glass transition temperature is 126° C. or higher, a range, in which interlayer movement of an ultraviolet absorber, an organic or inorganic pigment, an inorganic substance, a colored pigment, and the like does not occur even when sterilization is carried out at a high pressure steam sterilization temperature of 121° C., and the substances can be prevented from being eluted into liquid contents or bleeding out of the container, is widened and particularly, overkill sterilization that is internally accepted for injection for infusion solutions and liquid medicine is possible. Thus, this case is preferable.

Rotational motion of polymer chains occurs by polymer molecular motion represented as micro brownian motion at the level of a molecule in a polymeric material. When the light-shielding sheet and the container are placed under an environment of the glass transition temperature or higher, the micro brownian motion of the molecular chains is promoted and thus the polymeric material becomes soft. The interlayer movement in which the ultraviolet absorber, the organic or inorganic pigment, the inorganic substance, the colored pigment, the fluorescent brightening agent, the dye and the like used for the light-shielding layer are easily transferred to other layers easily occurs and thus contamination of other containers and lines resulting from a problem of elution of the substances into the container or bleeding out of the substances to the outside of the container occur.

Particularly, the glass transition temperature is a temperature at which micro-Brownian motion of polymer chains starts and therefore reflects the ease of polymer chain motion. Thus, the glass transition temperature is very important. Since movement of polymers is determined by internal rotation of the polymer chains and steric hindrance, it is important to select a resin in which a large number of aromatic rings or heterocyclic rings, which impart steric hindrance, are incorporated or introduced into a main chain and side chains, a resin in which molecules of halogenides and the like are present in a main chain and side chains, or a resin in which a distance between molecules by a hydrogen bond is short in addition to the glass transition temperature as a method of easily preventing interlayer movement of the ultraviolet absorber, the organic or inorganic pigment, the inorganic substance, the colored pigment, the fluorescent brightening agent, the dye and the like used for the light-shielding layer to other layers.

It is found that the best method of preventing and solving a problem of contamination of other containers or lines resulting from the problem of elution of the substances into the container or bleeding out of the substances to the outside of the container is to design the container material which is determined under the consideration of the temperature and environment in which the light-shielding sheet and the container are placed or treated while taking such points into consideration by preventing or blocking interlayer movement without transfer of the ultraviolet absorber, the organic or inorganic pigment, the inorganic substance, the colored pigment and the like used for the light-shielding layer into other layers.

Particularly, it is necessary for the eluate-blocking layer to select a resin from resins in which the glass transition temperature can be set to be high under the temperature and environment in which the light-shielding sheet and the container are placed or treated such that the rotational motion of polymer chains does not occur by micro-Brownian motion, or a large number of aromatic rings or heterocyclic rings, which impart steric hindrance, are incorporated or introduced into a main chain and side chains, molecules of halogenides and the like are present in a main chain and side chains, and in which a distance between molecules by hydrogen bond is short. As the most suitable resins to be used for the sheet and the container among these resins, there are a cyclic polyolefin-based resin, a fluorine-based resin, a polyester-based resin, and a polyamide-based resin. It is necessary to form the eluate-blocking layer using these resins as main components. In addition, by forming the light-shielding layer using such a cyclic polyolefin-based resin, a fluorine-based resin, and a polyester-based resin in combination as a main component, the effect can be further enhanced.

Examples of the cyclic polyolefin-based resin include polymers of various cyclic olefin monomers, copolymers of cyclic olefin monomers and monomers such as ethylene and hydrogen additives thereof. Examples of the cyclic polyolefin monomers include bicyclic cycloolefins such as norbornene, norbornadiene, methylnorbornene, dimethylnorbornene, ethylnorbornene, chlorinated norbornene, chloromethylnorbornene, trimethylsilylnorbornene, phenylnorbornene, cyanonorbornene, dicyanonorbornene, methoxycarbonylnorbornene, pyridylnorbornene, nadic anhydride, and nadic acid imide; tricyclic cycloolefins such as dicyclopentadiene, dihydrodicyclopentadiene, and alkyl, alkenyl, alkylidene and aryl substitutes thereof; tetracyclic cycloolefins such as dimethanohexahydronaphthalene and dimethanooctahydronaphthalene, and alkyl, alkenyl, alkylidene and aryl substituents thereof; pentacyclic cycloolefins such as tricyclopentadiene; and hexacyclic cycloolefins such as hexacycloheptadecene. Also included are compounds containing the norbornene ring, such as dinorbornene and compounds obtained by bonding two norbornene rings via hydrocarbon chains or ester groups and the like, alkyl and aryl substituents thereof, and the like.

As the polyolefin-based resin of the present invention, preferred are polynorbornene-based resins obtained by polymerizing one or two or more of norbornene-based monomers containing the norbornene skeleton in their molecular skeletons, such as dicyclopentadiene, norbornene and tetracyclododecene; hydrogen additives thereof; one of or mixtures of two or more of these polynorbornene-based resins and hydrogenation products thereof; and the like. From the viewpoint of strength and flexibility when the sheet is formed into as a liquid storing container, these resins are preferable.

The polymerization method or polymerization mechanism of monomer molecules of each cyclic polyolefin-based resin in the present invention may be either ring-opening polymerization or addition polymerization. As the polymerization method and the polymerization mechanism when a plurality of monomers are used in combination, known methods can be used. For example, a plurality of monomers can be combined together while the plural monomers are monomers, and then copolymerization may be performed. As an alternative, after being polymerized to some extent, the monomers may be combined together into a block copolymer.

For example, as a specific structure of the cyclic polyolefin-based resin, a structural formula expressed by the following formula (1) or (2) can be used. When the polyolefin-based resin particularly expressed by the following formula (1) of these formulae is used, the occurrence of fracturing and cracks of the layer itself due to an impact or pressure from the outside and the like is reduced. Particularly, the storage stability of a drug is improved and thus, it is found that a higher effect can be exhibited.

[Chem. 1]

(in the formula, $R^1$, $R^2$, $R^3$ and $R^4$, which may be identical to or different from each other, each represent an organic group having 1 to 20 carbon atoms, and $R^1$ and $R^2$ and/or $R^3$ and $R^4$ each may form a ring. m and p each represent an integer of 0 or 1 or more. l and n each represent an integer of 1 or more.)

More specific examples of the organic group having 1 to 20 carbon atoms include alkyl groups such as methyl, ethyl, n-propyl, i-propyl, n-butyl, i-butyl, sec-butyl, t-butyl, i-pentyl, t-pentyl, n-hexyl, n-heptyl, n-octyl, t-octyl (1,1-dimethyl-3,3-dimethylbutyl), 2-ethylhexyl, nonyl, decyl, undecyl, dodecyl, tridecyl, tetradecyl, pentadecyl, hexadecyl, heptadecyl, octadecyl, nonadecyl and icosyl; cycloalkyl groups such as cyclopentyl, cyclohexyl, cycloheptyl and cyclooctyl; alkylcycloalkyl groups such as 1-methylcyclopentyl, 1-methylcyclohexyl and 1-methyl-4-i-propylcyclohexyl; alkenyl groups such as allyl, propenyl, butenyl, 2-butenyl, hexenyl and cyclohexenyl; aryl groups such as a phenyl group, a naphtyl group, a methylphenyl group, a methoxyphenyl group, a biphenyl group, a phenoxy phenyl group, a chlorophenyl group and a sulfophenyl group; and aralkyl groups such as a benzyl group, 2-phenylethyl group (phenethyl group), α-methyl benzyl group and α,α-dimethyl benzyl group, but are not limited thereto. In addition, one of the above-described organic groups may be used alone or a combination of two or more thereof may be used.

The glass transition temperature of such cyclic polyolefins can be appropriately adjusted by appropriately selecting values of l, m, n and p in the above formulae (1) and (2), or substituents. The glass transition temperature of polycycloolefins other than the polycycloolefins expressed by formulae (1) and (2) may be arbitrarily adjusted to obtain a desired value by appropriately selecting the species, blending ratio, and sequence of monomers to be used, the type of substituents, and the like.

The cyclic polyolefin expressed by formula (1) may be a commercially available product. For example, Zeonex and Zeonoa (products of Nippon Zeon Co., Ltd.) are suitably used. The polycycloolefin represented by formula (2) also may be a commercially available product. For example, Apel (product of Mitsui Chemicals Inc.) and TOPAS (product of TICONA) are suitably used.

As the cyclic polyolefin of the present invention, it is most preferable to use the cyclic polyolefin expressed by the above formula (1) and it is more preferable to use the resin expressed by the above formula (1) alone without including other resins. However, other resins can be added in a range of 40% or less. As other resins, polyethylene-based resins are preferable. However, the resins are not particularly limited as long as the resins are resins which are commonly used.

The fluorine-based resin used for the light-shielding layer, the eluate-blocking layer A and the eluate-blocking layer B is a synthetic resin obtained by polymerization of olefin including fluorine and known fluorine-based resins including copolymers of other resins and monomers, modifications, and substituents can be used. The resin is not particularly limited as long as the density is 1.3 g/cm$^3$ or higher. When the density is lower than 1.3 g/cm$^3$, interlayer movement of light-shielding substances and the blocking effect cannot be sufficiently obtained and this case is not preferable. Examples of the fluorine-based resin include polytetrafluoroethylene (abbreviation: PTFE), polychlorotrifluoroethylene (abbreviation: PCTFE, CTFE), polyvinylidene fluoride (abbreviation: PVDF), polyvinyl fluoride (abbreviation: PVF), perfluoroalkoxy fluororesin (abbreviation: PFA), an ethylenetetrafluoride-propylenehexafluoride copolymer (abbreviation: FEP), an ethylene-tetrafluoroethylene copolymer (abbreviation: ETFE), an ethylene-chlorotrifluoroethylene copolymer (abbreviation: ECTFE), a tetrafluoroethylene-perfluoroalkylvinyl ether copolymer resin, a perfluoroethylene-propene copolymer (FEP), polyvinylidene fluoride (PVdF), a perfluoroethylene-propylene copolymer, a perfluoroethylene-propene copolymer, polyvinylidene fluoride, polychlorotrifluoroethylene, a tetrafluoroethylene-perfluorodioxole copolymer, polyvinyl fluoride, EFEP having improved adhesion, and a tetrafluoroethylene/perfluoro(alkylvinylehter)/chlorotrifluoroethylene copolymer (CPT).

The polyester-based resin used for the light-shielding layer, the eluate-blocking layer A, and the eluate-blocking layer B is a copolymer of dicarboxylic acid and diol. Known polyester-based resins including copolymers of other resins and monomers, modifications, and substituents, polymers including an elastomer component, and mixtures can be used and there is no particular limitation thereto.

Examples of the dicarboxylic acid include succinic acid, adipic acid, terephthalic acid, isophthalic acid, suberic acid, sebacic acid, itaconic acid, dodecanedioic acid, cellulose acetate, naphthalene-2,6-dicarboxylic acid, and succinic acid. As other acid components, diphenylsulfone dicarboxylic acid, hexahydro terephthalic acid, hexahydro isophthalic acid, azelaic acid or the like can be selected. One of these acids may be used alone or a combination of two or more thereof may be used. Examples of the diol include glycols such as 1,4-butanediol, 1,3-propanediol, 1,4-cyclohexane dimethanol, 2,3-butanediol, 1,3-butanediol, 1,4-pentanediol, 2,4-pentanediol, 1,6-hexanediol, neopentyl glycol, ethylene glycol, diethylene glycol, propylene glycol, and butylene glycol, and polyoxyalkylene glycols such as polyethylene glycol, polypropylene glycol, and polytetramethylene glycol, neopentyl glycol, diethylene glycol, 1,4-cyclohexane dimethylol, 2,2-bis(4-β-hydroxyethoxyphenyl)propane, and 1,4-bis(β-hydroxyethoxy)benzene. One of these diols may be used alone or a combination of two or more thereof may be used.

Particularly, a copolymer including terephthalic acid of a first main component and isophthalic acid of a second main component as dicarboxylic acid components and ethylene glycol of a main component as a diol component exhibits a high interlayer moving substance-blocking effect and thus is preferable. The sum of copolymerization ratios of terephthalic acid and isophthalic acid of the dicarboxylic acid components is preferably 95% by mole to 100% by mole, and more preferably 99% by mole to 100% by mole. In addition, the copolymerization ratio of ethylene glycol of the diol component is preferably 95% by mole to 100% by mole and more preferably 99% by mole to 100% by mole. The intrinsic viscosity (IV) is preferably 0.60 dl/g to 0.85 dl/g. The intrinsic viscosity in the present invention is a value that is measured at a temperature of 30° C. using a mixture solvent of a phenol and 1,1,2,2-tetrachloroethane (mass ratio 1/1) according to JIS K 7367-5. When the intrinsic viscosity is lower than 0.60 dl/g, the molecular weight of the resin is excessively reduced and a sufficient interlayer moving substance-blocking effect is hardly obtained. When the intrinsic viscosity is higher than 0.85 dl/g, the viscosity at the time of thermofusion is excessively increased and extrusion is difficult. However, in this case, the productivity is lowered and it is therefore not preferable.

Further, the polyester-based resin may contain an aliphatic oxycarboxylic acid unit. At this time, specific examples of the aliphatic oxycarboxylic acid to which an aliphatic oxycarboxylic acid is imparted include lactic acid, glycolic acid, 2-hydroxy-n-butyric acid, 2-hydroxy caproic acid, 6-hydroxy caproic acid, 2-hydroxy-3,3-dimethyl butyric acid, 2-hydroxy-3-methyl butyric acid, 2-hydroxy isocaproic acid, or lower alkyl esters thereof, or intramolecular esters. In the case in which these have an optical isomer resin, the optical isomer resin may be any of D-resin, L-resin and racemic resin, and the morphology may be a solid, a liquid or an aqueous solution. One of these aliphatic oxycarboxylic acids may be used alone or in a mixture of two or more thereof.

The polyester-based resin may be a resin obtained by copolymerizing "a trifunctional or higher functional aliphatic polyhydric alcohol", "a trifunctional or higher functional aliphatic polyvalent carboxylic acid or an acid anhydride thereof", or "a trifunctional or higher functional aliphatic polyvalent oxycarboxylic acid". Specific examples of the trifunctional or higher functional aliphatic polyhydric alcohol include trimethylolpropane and glycerol. These polyhydric alcohols may be used alone or a mixture of two or more thereof may be used. Specific examples of tetrafunctional aliphatic polyhydric alcohol include pentaerythritol. Specific examples of the trifunctional or higher functional aliphatic polyvalent carboxylic acid or an acid anhydride thereof include propanetricarboxylic acid and an acid anhydride thereof. Specific examples of tetrafunctional polyvalent carboxylic acid or an acid anhydride thereof include cyclopentane tetracarboxylic acid and an acid anhydride thereof. These acids may be used alone or a mixture of two or more thereof may be used. The trifunctional aliphatic oxycarboxylic acid is classified into (i) a type having two carboxyl groups and one hydroxyl group in the same molecule and (ii) a type having one carboxyl group and two hydroxyl groups in the same molecule, and either type may be used. Specifically, malic acid and the like are preferably used. Also, the tetrafunctional aliphatic oxycarboxylic acid is classified into (i) a type having three carboxyl groups and one hydroxyl group together in the same molecule, (ii) a type having two carboxyl groups and two hydroxyl groups together in the same molecule, and (iii) a type having three hydroxyl groups and one carboxyl group together in the same molecule, and any type may be used. Specific examples thereof include citric acid and tartaric acid. These acids may be used alone or a mixture of two or more thereof may be used.

The polyamide-based resin used for the light-shielding layer, the eluate-blocking layer A and the eluate-blocking layer B is composed of a crystalline polymer having an amide bond [—NHCO—] as repeating units in the molecule. Examples of the polyamide-based resin include a resin composed of crystalline polymer in which an amide bond is bonded with an aliphatic structure or alicyclic structure, so-called nylon resin. Examples of the nylon resin include nylon 6, nylon 11, nylon 12, nylon 610, nylon 612, nylon 6/66, nylon 66/12, and a blend of at least two or more of these resins. However, the nylon resin is not particularly limited as long as the nylon resin is a resin which is commonly used. In addition, examples of polyamide-based elastomers [TPAE] include a nylon 6/polyester copolymer, a nylon 6/polyether copolymer, a nylon 12/polyester copolymer, and a nylon 12/polyether copolymer but are not limited thereto.

In the case in which the polyolefin-based resin and/or the fluorine-based resin are used for the light-shielding layer, the eluate-blocking layer A and the eluate-blocking layer B to form a sheet, if a total thickness of a layer made of the polyolefin-based resin and a layer made of the fluorine-based resin is 80 μm or more, the dampproofness of the sheet against water vapor can be improved and thus this case is preferable.

One of an ultraviolet absorber, an organic or inorganic pigment, an inorganic substance, a colored pigment and the like used for the light-shielding layer may be used alone or a combination of two or more thereof may be used and the type and number are not limited. Further, a known ultraviolet absorber, organic or inorganic pigment, inorganic substance, colored pigment, fluorescent brightening agent, dye, and the like, which are commonly used, may be used.

As the ultraviolet absorber, the organic or inorganic pigment, the inorganic substance, the colored pigment, and the like, for example, an organic ultraviolet absorbers and light-shielding agent such as benzophenone-based compounds, oxybenzone-based compounds, benzoylmethane-based compounds, butyl-methoxybenzoylmethane-based compounds, benzotriazole-based compounds, triazole-based compounds, benzoate-based compounds, hydroxyphenyl triazine-based compounds, salicylate-based compounds, triaryl triazine-based compounds, cinnamic acid-based compounds, 2-ethylhexyl para-methoxycinnamate, para-amino benzoic acid-based compounds, octyl para-dimethylamino benzoate, camphor-based compounds, and methylbenzylidene camphor. The above-described ultraviolet absorber and light-shielding agent have an advantage of having better transparency than an inorganic ultraviolet absorber and light-shielding agent. Among these, a benzophenone-based ultraviolet absorber and a benzotriazole-based ultraviolet absorber are most preferable from the viewpoint of light-shielding performance and visibility inspection properties at 450 nm.

Specific examples of the benzophenone-based ultraviolet absorber include, 2,4-dihydroxy benzophenone, 2,2',4,4'-tetrahydroxy benzophenone, 2-hydroxy-4-(β-hydroxy-ethoxy)-benzophenone, bis(5-benzoyl-4-hydroxy-2-methoxyphenyl)methane, 2-hydroxy-4-methoxybenzophenone, 2,2'-dihydroxy-4-methoxybenzophenone, 2-hydroxy-4-octyloxybenzophenone, and 2-hydroxy-4-n-octyloxybenzophenone. Among these, an ultraviolet absorber having good heat resistance is preferable and bis(5-benzoyl-4-hydroxy-2-methoxyphenyl)methane and 2,2',4,4'-tetrahydroxy benzophenone is particularly preferable.

Specific examples of the benzotriazole-based ultraviolet absorber include 2-(5-chloro-2-benzotriazol)-6-tert-butyl-p-cresol, 2-(5-methyl-2-hydroxyphenyl)benzotriazol, 2-[3,5-bis(2,2-dimethylpropyl)-2-hydroxyphenyl]benzotriazol, 2-(3-tertiary butyl-5-methyl-2-hydroxyphenyl)-5-chlorobenzotriazol, 2-(3,5-ditertiary butyl-2-hydroxyphenyl)-5-chlorobenzotriazol, 2-[2-hydroxy-3,5-bis(α,α-dimethylbenzyl)phenyl]-2H-benzotriazol, 2,2-methylenebis[4-(1,1,3,3-tetramethylbutyl)-6-(2H-benzotriazol-2-yl)phenol], 2-(3-tert-butyl-2-hydroxy-5-methylphenyl)-5-chloro-2H-benzotriazol, 2,2'-methylenebis [4-(1,1,3,3-tetramethylbuthyl)-6-[(2H-benzotriazol-2-yl)phenol]], 2-(2'-hydroxy-5'-methylphenyl)benzotriazol, 2(2'-hydroxy-3-'-tert-butyl-5'-methylphenyl)-5-chlorobenzotriazol, and 2-(2-hydroxy-5-methylphenyl)benzotriazol. Among these, 2-[2-hydroxy-3,5-bis(α,α-dimethylbenzyl)phenyl]-2H-benzotriazol, 2,2-methylenebis[4-(1,1,3,3-tetramethylbutyl)-6-(2H-benzotriazol-2-yl)phenol], and 2-[5-chloro(2H)-benzotriazol-2-yl]-4-methyl-6-(tert-butyl)phenol having good heat resistance are preferable.

Specific examples of the triazine-based ultraviolet absorber include 2,4,6-tris(2-hydroxy-4-hexyloxy-3-methylphenyl)-1,3,5-triazine, 2-[2-hydroxy-4-(hexyloxy)phenol]-4,6-diphenyl-1,3,5-triazine, and 2-(4,6-diphenyl-1,3,5-triazine-2-yl)-5-[2-(2-ethyl hexyloxy)ethoxy]phenol. Among these, 2,4-bis(2,4-dimethylphenyl)-6-(2-hydroxy-4-n-octyloxyphenyl-1,3,5-triazine having good heat resistance is preferable.

In addition, as the inorganic ultraviolet absorber and light-shielding agent, titanium oxide, zinc oxide, iron oxide, cerium oxide, zirconium oxide, nickel oxide, magnesium oxide, mica, kaolin, sericite, or modifications thereof can be used.

A colorant or pigment such as an organic pigment such as an organic pigment such as phthalocyanine or inorganic pigment can be used. The pigments having colors of yellow, blue, green, orange, red, brown, black, white and the like may be used alone or a mixture of two or more thereof may be used.

Specific examples of the fluorescent brightening agent and the dye include diaminostilbene-based materials, imidazole-based materials, thiazole-based materials, oxazol-based materials, 2,5-thiophenediyl(5-tert-butyl-1,3-benzoxazole) [Tinopal OB (product of BASF)] and the like), triazole-based materials, oxadiazole-based materials, thiadiazole-based materials, coumarin-based materials, naphthalimide-based materials, pyrazoline-based materials, pylene-based materials, imidazolone-based materials, benzidine-based materials, diaminocarbazole-based materials, oxacyanin-based materials, methine-based materials, pyridine-based materials, anthrapyridazine-based materials, distyryl-based materials, carbostyril-based materials, indole-based materials, and quinolinone-based materials and oxazole-based materials are preferably used.

The amount of the light-shielding substances such as the above-described ultraviolet absorber, organic or inorganic pigment, inorganic substance, and colored pigment added is preferably 0.01% by weight to 30% by weight with respect to the resin. When the amount of the light-shielding substances added is less than 0.01% by weight, a desired light-shielding function cannot be sufficiently exhibited. On the other hand, when the amount of the light-shielding substances added is more than 30% by weight, the light-shielding function is not significantly improved and not only is an increase in cost caused but also there is a high possibility of elution and bleeding out. Thus, this case is not preferable.

The light-shielding sheet and the container of the present invention are used for a sheets and a container for pharmaceutical products, such as drugs stored in soft bags such as PTP packaging and blister packaging, obtained by thermoforming a blister sheet, and an infusion solution and liquid medicine bag, and a plastic ampoule and vial, and a syringe, and medical supplies, various cosmetics, or foods.

The light-shielding sheet of the present invention has a multilayer structure of three or more layers including at least one light-shielding layer and eluate-blocking layer. Examples of the production method include known methods such as dry lamination, extrusion coating, extrusion lamination, co-extrusion lamination such as a co-extrusion inflation method or co-extrusion T-die method, co-extrusion water-cooling inflation, and heat lamination. These methods may be used alone or in combination. When co-extrusion lamination such as co-extrusion blowing or co-extrusion T-die method, co-extrusion water-cooled blowing, and heat lamination are particularly used, a multilayer sheet can be produced without using an organic adhesive such as a two-pack curing type polyester urethane-based adhesive or polyether urethane-based adhesive, or epoxy-based adhesive and these methods are preferable from the viewpoint of safety and hygiene of contents. Further, since gas barrier properties and water vapor barrier properties are imparted to the sheet, several layers may be laminated as barrier layers. As the material to be laminated on the barrier layer, a silica- or alumina-deposited PET film, silica- or alumina-deposited nylon film, aluminum-deposited PET film, aluminum-deposited nylon, aluminum foil, EVOH, PVA, PVDC, MXD nylon, organic or inorganic hybrid type barrier film, and the like can be used. When the multilayer is formed using different material resins and films, an adhesive resin can be used without causing a problem in safety and hygiene. As a resin, known resins can be used as long as the resins have excellent adhesion with different materials. These resins may be used alone or in combination of two or more thereof. Examples of the adhesive resin include an acid modified polyolefin resin and metallocene-based LLDPE. Preferred specific examples of the acid modified polyolefin resin include metal-cross-linked polyethylene (ionomer), an ethylene-acrylic acid copolymer (EAA), an ethylene-methacrylic acid copolymer (EMAA), an ethylene-ethyl acrylate copolymer (EEA), maleic anhydride-modified polyethylene, and maleic anhydride-modified polypropylene. Examples of unsaturated carboxylic acids to be graft-polymerized with the raw material for the acid modified polyolefin resin include acrylic acid, methacrylic acid, maleic acid, fumaric acid, itaconic acid, citraconic acid, acid anhydride thereof, and derivatives of esters, amides, imides, and metal salts. The metallocene-based LLDPE is a linear low-density polyethylene (LLDPE) obtained by polymerization using a metallocene catalyst. Examples thereof include ADMER produced by Mitsui Chemicals, Inc., Modic produced by Mitsubishi Chemical Corporation, DLZ produced by Tosoh Corporation, and a metallocene-based linear low-density polyethylene having a density of 0.91 or lower.

The light-shielding container of the present invention is produced using the light-shielding sheet of the present invention. The light-shielding container of the present invention has a multilayer structure of three or more layers including at least one light-shielding layer and eluate-blocking layer. Examples of the production method include known methods such as extrusion direct blow molding, extrusion drawing blow molding, multidimensional blow molding, exchange blow molding, injection blow molding, injection drawing blow molding (hot parison and cold parison), multilayer blow molding, and multilayer injection blow molding. These methods may be used alone or in combination. In addition, since the container has a multilayer structure, the adhesive resin can be used.

The light-shielding container of the present invention can be produced into a pouch or a soft bag through a typical method including cutting two light-shielding sheets and stacking the sheets such that each seal layer is disposed inside, and heat-sealing the periphery of the stacked sheets. In addition, after the seal layers of the light-shielding sheets are disposed inside to form a tubular shape, the periphery thereof may be heat-sealed for molding. The heat sealing of the light-shielding sheets may be carried out in a temperature range of 150° C. to 250° C. Further, it is more preferable to provide a discharge outlet (port) for discharging liquid contents at a part of the heat-sealed periphery from the viewpoint of improving discharge efficiency. The container may be sealed by welding a rubber plug to the port after the container is filled with liquid contents, or by welding a rubber plug to the port in advance or attaching a rubber plug to the port by insert injection molding. In the latter case, when the container is filled with liquid contents, methods of providing an opening at a part of the heat-sealed periphery or opening a part of the heat-sealed periphery at the time of filling and sealing the opened part by heat sealing after the container is filled with the liquid contents can be used.

In the present invention, the thickness of the barrier layer is preferably 5 μm to 200 μm and more preferably 10 μm to 100 μm from the viewpoint of the storage stability and flexibility of the light-shielding sheet and the container.

In the present invention, the total thickness of the light-shielding sheet and the container is preferably 50 μm to 2000 μm and more preferably 100 μm to 1200 μm although an appropriate range thereof varies depending on use of the container. When the total thickness is 50 μm or smaller, there is a possibility of lowering of strength for a sheet and a container. On the other hand, when the total thickness is larger than 2000 μm, a thickness of larger than 2000 μm is not required for a sheet and a container and an increase in cost is caused. Thus, this case is not preferable.

The light-shielding sheet and the container of the present invention are applicable to a sheet and a container in which pharmaceutical products and medical supplies, such as a blister sheet, an infusion solution and liquid medicine bag, a plastic ampoule and vial, and a plastic syringe, and drugs, various cosmetics, or foods can be stored. Although the contents are not particularly limited, the sheet and container can be used for contents such as powders, capsules, tablets, granules, oral disintegration tablets, and liquids and liquid contents. Among these, when the contents are contents that are approved by regulations for plastic pharmaceutical containers of the Japanese Pharmacopoeia, a higher effect is obtained and this case is preferable. The contents are liquids for pharmaceutical or medical use, and particularly for injections such as an infusion solution and a liquid medicine, from the viewpoint of the safety and hygiene of the contents, the light-shielding sheet and the container of the present invention by which various problems resulting from elution from light-shielding substances are solved are suitable. In the present invention, a liquid for pharmaceutical or medical use, as contents, is poured into a pouch, a soft bag, an ampoule, or a vial container and the container is sealed. Then, it is possible to solve a problem of elution or bleeding out of light-shielding substances when the container is stored at a high temperature of 50° C. or higher or subjected to a heat treatment represented as hot filling at 70° C. to 95° C., an inactivation treatment of viruses and the like at 60° C. to 70° C., a high pressure steam sterilization treatment at a temperature of 100° C. or higher, or the like. Particularly, even when the container is subjected to high pressure steam sterilization at a temperature of 110° C. or higher and then used, there is a high possibility of the above problem arising and thus the light-shielding sheet and the container of the present invention are most suitable.

A drug to which the light-shielding sheet and the container of the present invention are applicable is not particularly limited as long as the drug is a known drug in which deterioration and lowering of titer occur by ultraviolet rays. Examples thereof include diltiazem, nifedipine, nisoldipine, carbamazepine, nitrendipine verapamil, azasetron, paclitaxel, thiamine, amlodipine, olopatadine, palonosetron, irinotecan, epoprostenol, riboflavin, cyanocobalamin, pyridoxine, nicotinic acid amide, panthenol, biotin, ascorbic acid, cholecalciferol, tocopherol, phytonadione, ozagrel hydrochloride, olopatadine, ketoprofen, somatropin, menatetrenone, benidipine, and mecobalamin. Particularly, the application of the sheet and the container to levofloxacin which is deteriorated by ultraviolet rays and a derivative or modification thereof (ofloxacin, tosufloxacin, sparfloxacin, norfloxacin, enoxacin, ciprofloxacin, lomefloxacin, nalidixic acid, pipemidic acid, piromidic acid, and the like), palonosetron hydrochloride and a derivative or modification thereof is most preferable from the viewpoint of preventing drug deterioration.

EXAMPLES

Hereinafter, the present invention will be described in detail by way of Examples and Comparative Examples, which should not be construed as limiting the invention thereto.

Examples and Comparative Examples

According to the configurations shown in FIGS. 1A to 1G, multilayer sheets having three or more layers of a light-shielding layer, an eluate-blocking layer A, and an eluate-blocking layer B and containers were formed. The detailed configurations are specifically shown in Table 1.

As the resins for forming the sheets and containers, the following a to j were used for the light-shielding layer and the following I to XII were used for the eluate-blocking layers A and B.

a: Linear low-density polyethylene having a density of 0.908 and linear low-density polyethylene having a melting point of 105° C. (Harmolex, produced by Japan Polyethylene Corporation)

b: Metallocene-based linear low-density polyethylene having a density of 0.924 and a melting point of 120° C.) (Umerit, produced by Ube-Maruzen polyethylene)

c: High-density polyethylene having a density of 0.953 and a melting point of 132° C. (Novatec, produced by Japan Polyethylene Corporation)

d: Ziegler-based linear low-density polyethylene having a density of 0.923 and a melting point of 120° C. (Moretec, produced by Prime Polymer)

e: Polypropylene having a density of 0.90 and a melting point of 135° C. (Wintec, produced by Japan Polypropylene Corporation)

f: Cyclic polyolefin having a glass transition temperature of 136° C. (Zeonex, produced by Nippon Zeon Co., Ltd.)

g: Cyclic polyolefin having a glass transition temperature of 135° C. (Apel, produced by Mitsui Chemicals Inc.)

h: Fluorine-based resin having a density of 2.12 (Neofuron, produced by Daikin Kogyo Co., Ltd.)

i: Polyester-based resin having a density of 1.34 (isophthalic acid-modified polyester)

j: Cyclic polyolefin having a glass transition temperature of 75° C. (Apel, produced by Mitsui Chemicals Inc.)

I: Cyclic polyolefin having a glass transition temperature of 136° C. (Zeonex, produced by Nippon Zeon Co., Ltd.)

II: Cyclic polyolefin having a glass transition temperature of 135° C. (Apel, produced by Mitsui Chemicals Inc.)

III: Cyclic polyolefin having a glass transition temperature of 165° C. (Zeonoa, produced by Nippon Zeon Co., Ltd.)

IV: Cyclic polyolefin having a glass transition temperature of 105° C. (Zeonoa, produced by Nippon Zeon Co., Ltd.)

V: Cyclic polyolefin having a glass transition temperature of 75° C. (Zeonoa, produced by Nippon Zeon Co., Ltd.)

VI: Fluorine-based resin having a density of 2.12 (Neofuron, produced by Daikin Kogyo Co., Ltd.)

VII: Cyclic polyolefin having a glass transition temperature of 138° C. (Topas, produced by Daicel Polymer Ltd.)

VIII: Fluorine-based resin having a density of 2.1 (polychloro trifluoro ethylene)

IX: Fluorine-based resin having a density of 1.74 (Neofuron, produced by Daikin Kogyo Co., Ltd.)

X: Polyester-based resin having a density of 1.34 (copolymer of terephthalic acid, isophthalic acid, and ethylene glycol: isophtalic acid-modified polyester)

XI: Cyclic polyolefin having a glass transition temperature of 80° C. (Apel, produced by Mitsui Chemicals Inc.)

XII: Cyclic polyolefin having a glass transition temperature of 75° C. (Apel, produced by Mitsui Chemicals Inc.)

Since different resins are used for each layer as resins for forming the films and the containers, an adhesive resin may be used. The following a to c were used. The following a to c were used as light-shielding layers by incorporating light-shielding substances into the adhesive resin layer.

α: Admer (produced by Mitsui Chemicals Inc.)
β: Modic (produced by Mitsubishi Plastics, Inc.)
γ: Polyamide-based elastomer (produced by Daicel-Degussa, Ltd.)
δ: Polyamide-based resin nylon 12 (produced by Ube Industries, Ltd.)
ε: Resin obtained by mixing Harmolex (produced by Japan Polyethylene Corporation) and Wintec (produced by Japan Polypropylene Corporation) at 2:8

As resins for forming the films and the containers, an innermost layer, or an outermost layer, and other resin layers may be laminated and the above a to j, I to XII, and α to ε were used.

As the light-shielding substances used for the light-shielding layer, the following (1) to (9) were used.

The concentration used herein refers to % by weight of the following components incorporated into the light-shielding layer.

(1):
First component:
2-[5-chloro(2H)-benzotriazol-2-yl]-4-methyl-6-(tert-butyl)phenol (concentration: 0.9%)
Second component:
2,4-bis(2,4-dimethylphenyl)-6-(2-hydroxy-4-n-octyloxyphenyl-1,3,5-triazine (concentration: 0.25%)
Third component: 2,2',4,4'-tetrahydroxy benzophenone (concentration: 0.25%)

(2):
First component:
2-[5-chloro(2H)-benzotriazol-2-yl]-4-methyl-6-(tert-butyl)phenol (concentration: 0.5%)
Second component:
2,4-bis(2,4-dimethylphenyl)-6-(2-hydroxy-4-n-octyloxyphenyl-1,3,5-triazine (concentration: 0.5%)
Third component: 2,2',4,4'-tetrahydroxy benzophenone (density: 0.5%)

(3):
First component:
2-[5-chloro(2H)-benzotriazol-2-yl]-4-methyl-6-(tert-butyl)phenol (concentration: 0.9%)
Second component: Zinc oxide (concentration: 0.9%)

(4):
First component:
2-[5-chloro(2H)-benzotriazol-2-yl]-4-methyl-6-(tert-butyl)phenol (concentration: 0.75%)
Second component: YELLOW #021 (PEX MASTER COROR, produced by TOKYO PRINTING INK MFG. CO., LTD.) (concentration: 6%)

(5):
First component:
2-[5-chloro(2H)-benzotriazol-2-yl]-4-methyl-6-(tert-butyl)phenol (concentration: 1.8%)
Second component: 2-hydroxy-4-n-octyloxybenzophenone (concentration: 0.5%)
Third component: 2,5-thiophenediyl(5-tert-butyl-1,3-benzoxazole) (concentration: 0.3%)

(6):
First component:
2-[5-chloro(2H)-benzotriazol-2-yl]-4-methyl-6-(tert-butyl)phenol (concentration: 0.3%)
Second component: 2-hydroxy-4-n-octyloxybenzophenone (concentration: 0.25%)
Third component: 2,5-thiophenediyl(5-tert-butyl-1,3-benzoxazole) (concentration: 0.05%)
Fourth component:
2(2'-hydroxy-3'-tert-butyl-5'-methylphenyl)-5-chlorobenzotriazol (concentration: 0.3%)

(7):
First component:
2-[5-chloro(2H)-benzotriazol-2-yl]-4-methyl-6-(tert-butyl)phenol (concentration: 0.3%)
Second component:
2,4-bis(2,4-dimethylphenyl)-6-(2-hydroxy-4-n-octyloxyphenyl-1,3,5-triazine (concentration: 0.3%)
Third component: 2,5-thiophenediyl(5-tert-butyl-1,3-benzoxazole) (concentration: 0.05%)

(8):
First component:
2-[5-chloro(2H)-benzotriazol-2-yl]-4-methyl-6-(tert-butyl)phenol (concentration: 0.15%)
Second component: Zinc oxide (concentration: 10%)

(9):
First component:
2-[5-chloro(2H)-benzotriazol-2-yl]-4-methyl-6-(tert-butyl)phenol (concentration: 0.075%)
Second component: 2-hydroxy-4-n-octyloxybenzophenone (concentration: 0.25%)
Third component: 3,5-di-tert-butyl-4-hydroxybenzoate 2,4-di-tert-butylphenyl (concentration: 0.075%)

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Outermost layer | Type of resin | b | b | b | b | e | b | e | e | b | b | e | b |
| | Thickness (μm) | 60 | 60 | 80 | 70 | 40 | 70 | 40 | 40 | 70 | 80 | 60 | 130 |
| Adhesive layer | Type of resin | — | — | — | — | α | — | β | α | — | — | α | — |
| | Thickness (μm) | — | — | — | — | 20 | — | 15 | 20 | — | — | 20 | — |
| Eluate-blocking layer B | Type of resin | I | II | I | III | I | I | I | IV | — | — | — | — |
| | Thickness (μm) | 25 | 25 | 15 | 10 | 25 | 10 | 15 | 25 | — | — | — | — |
| Adhesive layer | Type of resin | — | — | — | — | — | — | — | — | — | — | — | — |
| | Thickness (μm) | — | — | — | — | — | — | — | — | — | — | — | — |

TABLE 1-continued

| | | | | | | | | | | | | | |
|---|---|---|---|---|---|---|---|---|---|---|---|---|---|
| Light-shielding layer | Type of resin | a | b | c | b | b | f | g | b | f | g | f | g |
| | Light-shielding substance | (1) | (2) | (3) | (1) | (1) | (1) | (1) | (1) | (1) | (1) | (1) | (2) |
| | Thickness (μm) | 80 | 80 | 50 | 60 | 80 | 40 | 40 | 80 | 40 | 40 | 40 | 40 |
| Adhesive layer | Type of resin | — | — | — | — | — | — | — | — | — | — | — | — |
| | Thickness (μm) | — | — | — | — | — | — | — | — | — | — | — | — |
| Eluate-blocking layer A | Type of resin | I | II | I | III | I | I | I | IV | I | III | III | III |
| | Thickness (μm) | 25 | 25 | 15 | 10 | 25 | 10 | 15 | 25 | 20 | 20 | 20 | 30 |
| Adhesive layer | Type of resin | — | — | — | — | α | — | β | α | — | — | α | — |
| | Thickness (μm) | — | — | — | — | 20 | — | 15 | 20 | — | — | 20 | — |
| Adhesive layer | Type of resin | — | — | — | — | — | — | — | — | — | — | — | — |
| | Thickness (μm) | — | — | — | — | — | — | — | — | — | — | — | — |
| Innermost layer | Type of resin | b | b | b | d | e | b | e | e | b | b | e | — |
| | Thickness (μm) | 60 | 60 | 80 | 70 | 40 | 70 | 40 | 40 | 70 | 80 | 60 | — |
| Total thickness | | 250 | 250 | 240 | 220 | 250 | 200 | 180 | 250 | 200 | 220 | 220 | 200 |
| Configuration in FIG. 1 | | (c) | (c) | (c) | (c) | (c) | (c) | (c) | (c) | (a) | (a) | (a) | (b) |
| Form of sheet or container | | Soft bag | Soft bag | Soft bag | Soft bag | Soft bag | Soft bag | Blister sheet | Soft bag | Soft bag | Soft bag | Soft bag | Soft bag |

| | | Example | | | | | | | | |
|---|---|---|---|---|---|---|---|---|---|---|
| | | 13 | 14 | 15 | 16 | 17 | 18 | 19 | 20 | 21 |
| Outermost layer | Type of resin | b | — | — | e | e | e | b | b | e |
| | Thickness (μm) | 200 | — | — | 50 | 50 | 60 | 95 | 45 | 30 |
| Adhesive layer | Type of resin | — | — | — | — | — | — | — | — | ε |
| | Thickness (μm) | — | — | — | — | — | — | — | — | 20 |
| Eluate-blocking layer B | Type of resin | I | X | VI | — | — | — | I | I | VII |
| | Thickness (μm) | 100 | 20 | 20 | — | — | — | 10 | 15 | 10 |
| Adhesive layer | Type of resin | — | α | γ | α | α | β | — | — | — |
| | Thickness (μm) | — | 20 | 20 | 20 | 20 | 25 | — | — | — |
| Light-shielding layer | Type of resin | b | b | h | γ | γ | i | f | b | b |
| | Light-shielding substance | (1) | (3) | (1) | (1) | (1) | (1) | (5) | (6) | (7) |
| | Thickness (μm) | 150 | 80 | 40 | 60 | 60 | 40 | 40 | 130 | 180 |
| Adhesive layer | Type of resin | — | — | γ | — | — | — | — | — | — |
| | Thickness (μm) | — | — | 20 | — | — | — | — | — | — |
| Eluate-blocking layer A | Type of resin | I | I | VI | VII | IX | X | I | I | VII |
| | Thickness (μm) | 100 | 20 | 20 | 20 | 20 | 10 | 10 | 15 | 10 |
| Adhesive layer | Type of resin | — | — | — | γ | δ | β | — | — | ε |
| | Thickness (μm) | — | — | — | 20 | 20 | 25 | — | — | 20 |
| Adhesive layer | Type of resin | — | — | — | α | α | — | — | — | — |
| | Thickness (μm) | — | — | — | 20 | 20 | — | — | — | — |
| Innermost layer | Type of resin | — | b | — | e | e | e | b | b | e |
| | Thickness (μm) | — | 80 | — | 50 | 50 | 60 | 95 | 45 | 30 |
| Total thickness | | 550 | 220 | 120 | 240 | 240 | 220 | 250 | 250 | 300 |
| Configuration in FIG. 1 | | (d) | (e) | (f) | (a) | (a) | (a) | (c) | (c) | (c) |
| Form of sheet or container | | Ampoule | Soft bag | Blister sheet | Soft bag | Soft bag | Soft bag | Soft bag | Soft bag | Blister sheet |

| | | Example | | | | | Comparative Example | | | |
|---|---|---|---|---|---|---|---|---|---|---|
| | | 22 | 23 | 24 | 25 | 26 | 1 | 2 | 3 | 4 |
| Outermost layer | Type of resin | e | e | e | b | b | b | e | b | b |
| | Thickness (μm) | 15 | 20 | 15 | 95 | 350 | 60 | 60 | 130 | 200 |
| Adhesive layer | Type of resin | — | — | — | — | — | — | α | — | — |
| | Thickness (μm) | — | — | — | — | — | — | 20 | — | — |
| Eluate-blocking layer B | Type of resin | XII | XI | — | — | I | V | — | — | c |
| | Thickness (μm) | 45 | 30 | — | — | 150 | 25 | — | — | 100 |
| Adhesive layer | Type of resin | — | — | — | — | — | — | — | — | — |
| | Thickness (μm) | — | — | — | — | — | — | — | — | — |
| Light-shielding layer | Type of resin | j | b | j | f | b | a | b | c | b |
| | Light-shielding substance | (8) | (9) | (8) | (5) | (1) | (1) | (4) | (2) | (1) |
| | Thickness (μm) | 180 | 180 | 270 | 60 | 150 | 80 | 40 | 40 | 150 |
| Adhesive layer | Type of resin | — | — | — | — | — | — | — | — | — |
| | Thickness (μm) | — | — | — | — | — | — | — | — | — |
| Eluate-blocking layer A | Type of resin | XII | XI | — | — | I | V | V | a | c |
| | Thickness (μm) | 45 | 30 | — | — | 150 | 25 | 20 | 30 | 100 |

TABLE 1-continued

| | | | | | | | | | | |
|---|---|---|---|---|---|---|---|---|---|---|
| Adhesive layer | Type of resin | — | — | — | — | — | — | α | — | — |
| | Thickness (μm) | — | — | — | — | — | — | 20 | — | — |
| Adhesive layer | Type of resin | — | — | — | — | — | — | — | — | — |
| | Thickness (μm) | — | — | — | — | — | — | — | — | — |
| Innermost layer | Type of resin | e | e | e | b | — | b | e | — | — |
| | Thickness (μm) | 15 | 20 | 15 | 95 | — | 60 | 60 | — | — |
| Total thickness | | 300 | 280 | 300 | 250 | 800 | 250 | 220 | 200 | 550 |
| Configuration in FIG. 1 | | (c) | (c) | (g) | (g) | (d) | (c) | (a) | (b) | (d) |
| Form of sheet or container | | Blister sheet | Blister sheet | Blister sheet | Soft bag | Vial | Soft bag | Soft bag | Soft bag | Ampoule |

When the column of the resin for the innermost layer of the eluate-blocking layer A is blank, the eluate-blocking layer is the innermost layer.

When the column of the resin for the outermost layer of the eluate-blocking layer B is blank, the eluate-blocking layer is the outermost layer.

The mark "-" indicates that the layer with "-" is not used in the configurations of the sheets and the containers.

[Production Method 1]

As structures shown in Table 1, in Examples 1 to 4, 10, 14, 19, 20, and 25 and Comparative Example 1, a multilayer sheet was prepared by a co-extrusion T-die method. Then, the innermost layers of two sheets were stacked to be opposite to each other as a seal layer and the periphery thereof was welded twice at a die temperature 175° C. for 3 seconds. At this time, a metallocene-based linear low-density polyethylene having a density of 0.935 and a melting point of 125° C. was used at a part of the periphery to form a discharge outlet (port) through an injection molding method. The discharge outlet was attached by welding which was carried out twice at a die temperature 200° C. for 3 seconds to prepare a soft bag for storing liquid having a volume of 100 ml.

[Production Method 2]

As the configuration shown in Table 1, in Examples 6 and 9, a multilayer sheet was prepared in the same manner as in Production method 1 except that a co-extrusion water-cooling inflation method was used and then a soft bag for storing liquid having a volume of 200 mL was prepared in the same manner as in Production Method 1.

[Production Method 3]

As the configuration shown in Table 1, in Examples 5, 7, 11, 16, 17, and 18, a multilayer sheet was prepared in the same manner as in Production Method 1 except that the die temperature at the time of welding the periphery was changed to 195° C. and the material for the discharge outlet was changed to polypropylene having a density of 0.90 and a melting point of 135° C. to carry out welding twice at 220° C. for 3 seconds. Thus, a soft bag having a volume of 100 mL was prepared.

[Production Method 4]

As the configuration shown in Table 1, in Examples 8 and 15, a multilayer sheet was prepared in the same manner as in Production Method 1 to form a sheet for blister molding for storing oral pharmaceutical products (tablets).

[Production Method 5]

As the configuration shown in Table 1, in Example 12, a multilayer sheet was prepared in the same manner as in Production Method 1 except that the die temperature at the time of welding the periphery was changed to 195° C. for 4 seconds and the material for the discharge outlet was changed to cyclic polyolefin having a glass transition temperature of 136° C. to carry out welding twice at 225° C. for 6 seconds. Thus, a soft bag having a volume of 100 mL was prepared.

[Production Method 6]

As the configuration shown in Table 1, in Example 13, a molten resin (parison) extruded from a circular die was interposed between two dies while putting air into the dies and thus an ampoule container was prepared by a co-extrusion direct blow molding method.

[Production Method 7]

As the configuration shown in Table 1, in Examples 21 to 24, a multilayer sheet was prepared in the same manner as in Production Method 1 to form a sheet for blister molding for storing oral pharmaceutical products (tablets).

[Production Method 8]

As the configuration shown in Table 1, in Example 26, a molten resin (parison) extruded from a circular die was interposed between two dies while putting air into the dies and thus a vial container for storing power and liquid was prepared by a co-extrusion direct blow molding method.

[Production Method 9]

As the configuration shown in Table 1, in Comparative Examples 1 and 3, a soft bag for storing liquid was prepared in the same manner as in Production Method 1.

[Production Method 10]

As the configuration shown in Table 1, in Comparative Example 2, a soft bag for storing liquid was prepared in the same manner as in Production Method 3.

[Production Method 11]

As the configuration shown in Table 1, in Comparative Example 4, an ampoule container was prepared in the same manner as in Production Method 6.

[Evaluation Method]

The following evaluation was performed on the light-shielding sheet and the container of the present invention.

In order to evaluate light-shielding properties, a part of each sheet and container of the above Examples and Comparative Examples was cut and evaluated using an ultraviolet and visible spectrophotometer.

The testing method for pharmaceutical containers of the Japanese Pharmacopoeia, Sixteenth Edition, was carried out by cutting some of the sheets and containers of the above Examples and Comparative Examples. In an eluate test, soft bags having different volumes were prepared and filled with purified water as liquid contents. After the bags were sealed, extraction at 100° C. for 2 hours was carried out and then evaluation was carried out. The results are shown in Table 2.

TABLE 2

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Light-shielding performance | 380 nm (%) | 0.1 | 0.1 | 0.2 | 0.2 | 0.1 | 0.3 | 0.3 | 0.1 | 0.3 | 0.3 | 0.3 | 0.2 |
| | 400 nm (%) | 13 | 7 | 27 | 15 | 12 | 17 | 16 | 10 | 18 | 20 | 17 | 15 |
| | 450 nm (%) | 69 | 56 | 77 | 75 | 68 | 75 | 75 | 69 | 73 | 73 | 72 | 70 |
| Test of pharmaceutical containers of Japanese Pharmacopoeia, Sixteenth Edition | 1. Heavy metal | ○ | ○ | ○ | ○ | ○ | ○ | ○ | ○ | ○ | ○ | ○ | ○ |
| | 2. Lead | ○ | ○ | ○ | ○ | ○ | ○ | ○ | ○ | ○ | ○ | ○ | ○ |
| | 3. Cadmium | ○ | ○ | ○ | ○ | ○ | ○ | ○ | ○ | ○ | ○ | ○ | ○ |
| | 4. Eluate (i) Foaming | ○ | ○ | ○ | ○ | ○ | ○ | ○ | ○ | ○ | ○ | ○ | ○ |
| | (ii) pH | ○ | ○ | ○ | ○ | ○ | ○ | ○ | ○ | ○ | ○ | ○ | ○ |
| | (iii) Potassium permanganate reducing susbtance | ○ | ○ | ○ | ○ | ○ | ○ | ○ | ○ | ○ | ○ | ○ | ○ |
| | (iv) Ultraviolet absorption spectrum | | | | | | | | | | | | |
| | 220 nm or longer and shorter than 240 nm | ○ | ○ | ○ | ○ | ○ | ○ | ○ | ○ | ○ | ○ | ○ | ○ |
| | 241 nm or longer and 350 nm or shorter | ○ | ○ | ○ | ○ | ○ | ○ | ○ | ○ | ○ | ○ | ○ | ○ |
| | (v) Evaporation residue | ○ | ○ | ○ | ○ | ○ | ○ | ○ | ○ | ○ | ○ | ○ | ○ |
| | Cytotoxicity test | ○ | ○ | ○ | ○ | ○ | ○ | ○ | ○ | ○ | ○ | ○ | ○ |

| | | Example | | | | | | | | |
|---|---|---|---|---|---|---|---|---|---|---|
| | | 13 | 14 | 15 | 16 | 17 | 18 | 19 | 20 | 21 |
| Light-shielding performance | 380 nm (%) | 0 | 0.1 | 0.3 | 0.2 | 0.2 | 0.3 | 0 | 0.1 | 0.1 |
| | 400 nm (%) | 8 | 24 | 18 | 14 | 15 | 19 | 0.4 | 8.4 | 4.4 |
| | 450 nm (%) | 57 | 75 | 75 | 74 | 75 | 74 | 82 | 83 | 84 |
| Test of pharmaceutical containers of Japanese Pharmacopoeia, Sixteenth Edition | 1. Heavy metal | ○ | ○ | ○ | ○ | ○ | ○ | ○ | ○ | ○ |
| | 2. Lead | ○ | ○ | ○ | ○ | ○ | ○ | ○ | ○ | ○ |
| | 3. Cadmium | ○ | ○ | ○ | ○ | ○ | ○ | ○ | ○ | ○ |
| | 4. Eluate (i) Foaming | ○ | ○ | ○ | ○ | ○ | ○ | ○ | ○ | ○ |
| | (ii) pH | ○ | ○ | ○ | ○ | ○ | ○ | ○ | ○ | ○ |
| | (iii) Potassium permanganate reducing susbtance | ○ | ○ | ○ | ○ | ○ | ○ | ○ | ○ | ○ |
| | (iv) Ultraviolet absorption spectrum | | | | | | | | | |
| | 220 nm or longer and shorter than 240 nm | ○ | ○ | ○ | ○ | ○ | ○ | ○ | ○ | ○ |
| | 241 nm or longer and 350 nm or shorter | ○ | ○ | ○ | ○ | ○ | ○ | ○ | ○ | ○ |
| | (v) Evaporation residue | ○ | ○ | ○ | ○ | ○ | ○ | ○ | ○ | ○ |
| | Cytotoxicity test | ○ | ○ | ○ | ○ | ○ | ○ | ○ | ○ | ○ |

| | | Example | | | | | Comparative Example | | | |
|---|---|---|---|---|---|---|---|---|---|---|
| | | 22 | 23 | 24 | 25 | 26 | 1 | 2 | 3 | 4 |
| Light-shielding performance | 380 nm (%) | 0.9 | 0.8 | 0.8 | 0 | 0 | 0.1 | 0.1 | 0.2 | 0 |
| | 400 nm (%) | 28 | 25 | 25 | 0.2 | 6 | 14 | 0.2 | 29 | 9 |
| | 450 nm (%) | 56 | 79 | 81 | 80 | 57 | 70 | 0.4 | 78 | 58 |
| Test of pharmaceutical containers of Japanese Pharmacopoeia, | 1. Heavy metal | ○ | ○ | ○ | ○ | ○ | ○ | ○ | ○ | ○ |
| | 2. Lead | ○ | ○ | ○ | ○ | ○ | ○ | ○ | ○ | ○ |
| | 3. Cadmium | ○ | ○ | ○ | ○ | ○ | ○ | ○ | ○ | ○ |
| | 4. Eluate (i) Foaming | ○ | ○ | ○ | ○ | ○ | x | ○ | ○ | ○ |
| | (ii) pH | ○ | ○ | ○ | ○ | ○ | ○ | ○ | ○ | ○ |

TABLE 2-continued

| | | | | | | | | | | |
|---|---|---|---|---|---|---|---|---|---|---|
| Sixteenth Edition | (iii) Potassium permanganate reducing susbtance | o | o | o | o | o | x | x | x | x |
| | (iv) Ultraviolet absorption spectrum | o | o | o | o | o | x | x | x | x |
| | 220 nm or longer and shorter than 240 nm | o | o | o | o | o | x | x | x | x |
| | 241 nm or longer and 350 nm or shorter | o | o | o | o | o | x | x | x | x |
| | (v) Evaporation residue | o | o | o | o | o | x | x | x | x |
| | Cytotoxicity test | o | o | o | o | o | — | — | — | — |

The mark "O" means that the result is adequate.
The mark "X" means the result is inadequate.
The mark "-" means that the test is not carried out.

In Examples 1 to 26, regarding light-shielding performance, light transmittance at 380 nm was 0% to 0.9%, the light transmittance at 400 nm was 0.2% to 28%, and the light transmittance at 450 nm was 56% to 84%. In addition, the results satisfied a total light transmittance of 55% or higher at 450 nm, prescribed in the Japanese Pharmacopoeia and there was no problem in the results of the elution test.

In addition, in Examples 1 to 8, 13 to 15, 19 to 23, and 26 (configurations having the eluate-blocking layer B), there was no stickiness on the outside of the sheets and containers and bleeding out could be prevented. In addition, in Examples 9 to 12, 16 to 18, 24, and 25, since a resin layer which hardly allows elution of light-shielding substances to the light-shielding layer was provided, there was no stickiness on the outside of the sheet and containers and bleeding out could be prevented without the eluate-blocking layer B.

On the other hand, in Comparative Examples 1 to 4, irrespective of selection of light-shielding substances, all the containers were determined to be inadequate in the elution test.

Further, there was stickiness on the outside of the containers and bleeding out could not be prevented.

REFERENCE SIGNS LIST

1 LIGHT-SHIELDING LAYER
2 ELUATE-BLOCKING LAYER A
3 INNERMOST LAYER
4 OUTERMOST LAYER
5 ELUATE-BLOCKING LAYER B

The invention claimed is:

1. A light-shielding sheet that has a multilayer structure of three or more layers comprising one or more light-shielding layers and one or more eluate-blocking layers, the sheet comprising:
an outermost layer positioned on an outermost side when the light-shielding sheet is formed into a container;
an innermost layer positioned on an innermost side when the light-shielding sheet is formed into a container; and
a first intermediate layer positioned between the outermost and innermost layers,
wherein the light-shielding layer is the first intermediate layer made of a resin containing at least one of an ultraviolet absorber, an organic pigment, an inorganic pigment, an inorganic substance, a colored pigment, a fluorescent brightening agent, and a dye,
the eluate-blocking layer is at least one of the outermost and innermost layers, or a second intermediate layer positioned between the first intermediate layer and at least one of the outermost and innermost layers, and
a total light transmittance of the light-shielding sheet at a wavelength of 380 nm or shorter is 1% or lower and a total light transmittance of the light-shielding sheet at a wavelength of 380 nm to 400 nm is 30% or lower, and
the light-shielding layer has any one of a cyclic polyolefin-based resin, a fluorine-based resin, and a polyester-based resin as a main component.

2. The light-shielding according to claim 1,
wherein a cyclic polyolefin-based resin is used for the eluate-blocking layer and the light-shielding layer and a glass transition temperature thereof is 60° C. or higher.

3. The light-shielding sheet according to claim 2,
wherein the glass transition temperature of the cyclic polyolefin-based resin is 110° C. or higher.

4. The light-shielding sheet according to claim 1,
wherein the eluate-blocking layer and the light-shielding layer have a fluorine-based resin as a main component, and
a density of the fluorine-based resin is 1.3 g/cm$^3$ or higher.

5. The light-shielding sheet according to claim 1,
wherein a total light transmittance at a wavelength of 450 nm of the light-shielding sheet is 15% or higher.

6. The light-shielding sheet according to claim 5,
wherein the total light transmittance at a wavelength of 450 nm of the light-shielding sheet is 55% or higher.

7. A light-shielding container that is produced using the light-shielding sheet according to claim 1.

8. A container
wherein a solution for pharmaceutical and medical use is stored in the light-shielding container according to claim 7 as contents and
the container is sterilized with high pressure steam at a temperature of 101° C. or higher.

9. The container according to claim 8,
wherein the solution for pharmaceutical and medical use is a liquid drug in which at least one of deterioration, lowering of titer, and impurity formation is caused by one or more of the group consisting of ultraviolet light and visible light at a wavelength range of 220 nm to 450 nm.

10. The container according to claim 9,
wherein the drug includes one of the group consisting of levofloxacin, a derivative thereof, and a modification thereof.

11. The container according to claim 9,
wherein the drug includes one of the group consisting of palonosetron hydrochloride, a derivative thereof, and a modification thereof.

12. A method of producing a light-shielding container comprising:
producing a container using the light-shielding sheet according to claim 1, by one or more methods selected from the group consisting of extrusion direct blow molding, extrusion drawing blow molding, multidimensional blow molding, exchange blow molding, injection blow molding, injection drawing blow molding, multilayer blow molding, and multilayer injection blow molding.

13. The light-shielding sheet according to claim 1, wherein the eluate-blocking layer and the light-shielding layer have a polyester-based resin as a main component, and an intrinsic viscosity of the polyester-based resin according to JIS K 7367-5 is 0.60 dl/g to 0.85 dl/g.

14. The light-shielding sheet according to claim 13, wherein the polyester-based resin is a copolymer of dicarboxylic acid and diol, the dicarboxylic acid includes terephthalic acid as a first main component of the dicarboxylic acid and isophthalic acid as a second main component of the dicarboxylic acid, and diol includes ethylene glycol as a main component thereof.

15. The light-shielding sheet according to claim 1, wherein a thickness of the light-shielding sheet is 100 μm to 1200 μm.

16. The light-shielding sheet according to claim 1,
wherein the eluate-blocking layer has any one of a cyclic polyolefin-based resin, a fluorine-based resin, a polyester-based resin, and a polyimide-based resin as a main component.

17. A light-shielding sheet that has a multilayer structure of three or more layers comprising one or more light-shielding layers and one or more eluate-blocking layers, the sheet comprising:
an outermost layer positioned on an outermost side when the light-shielding sheet is formed into a container;
an innermost layer positioned on an innermost side when the light-shielding sheet is formed into a container; and
a first intermediate layer positioned between the outermost and innermost layers,
wherein the light-shielding layer is the first intermediate layer made of a resin containing at least one of an ultraviolet absorber, an organic pigment, an inorganic pigment, an inorganic substance, a colored pigment, a colored pigment, a fluorescent brightening agent, and a dye,
the eluate-blocking layer is at least one of the outermost and innermost layers, or a second intermediate layer positioned between the first intermediate layer and at least one of the outermost and innermost layers, and
a total light transmittance of the light-shielding sheet at a wavelength of 380 nm or shorter is 1% or lower and a total light transmittance of the light-shielding sheet at a wavelength of 380 nm to 400 nm is 30% or lower, and
the light-shielding layer has at least any one of a linear low-density polyethylene-based resin having a density of 0.905 or higher, a high-density polyethylene-based resin having a density of 0.94 or higher, and a polypropylene-based resin having a density of 0.88 or higher as a main component.

18. The light-shielding sheet according to claim 17,
wherein the eluate-blocking layer has any one of a cyclic polyolefin-based resin, a fluorine-based resin, a polyester-based resin, and a polyimide-based resin as a main component.

19. The light-shielding sheet according to claim 17,
wherein a total light transmittance at a wavelength of 450 nm of the light-shielding sheet is 15% or higher.

20. The light-shielding sheet according to claim 19,
wherein the total light transmittance at a wavelength of 450 nm of the light-shielding sheet is 55% or higher.

21. A light-shielding container that is produced using the light-shielding sheet according to claim 17.

22. A container
wherein a solution for pharmaceutical and medical use is stored in the light-shielding container according to claim 21 as contents and
the container is sterilized with high pressure steam at a temperature of 101° C. or higher.

23. The container according to claim 22,
wherein the solution for pharmaceutical and medical use is a liquid drug in which at least one of deterioration, lowering of titer, and impurity formation is caused by one or more of the group consisting of ultraviolet light and visible light at a wavelength range of 220 nm to 450 nm.

24. The container according to claim 23,
wherein the drug includes one of the group consisting of levofloxacin, a derivative thereof, and a modification thereof.

25. The container according to claim 23,
wherein the drug includes one of the group consisting of palonosetron hydrochloride, a derivative thereof, and a modification thereof.

26. A method of producing a light-shielding container comprising:
producing a container using the light-shielding sheet according to claim 17 by one or more methods selected from the group consisting of extrusion direct blow molding, extrusion drawing blow molding, multidimensional blow molding, exchange blow molding, injection blow molding, injection drawing blow molding, multilayer blow molding, and multilayer injection blow molding.

27. The light-shielding sheet according to claim 17,
wherein a thickness of the light-shielding sheet is 100 μm to 1200 μm.

* * * * *